US009843902B1

(12) United States Patent
Skudlark et al.

(10) Patent No.: US 9,843,902 B1
(45) Date of Patent: Dec. 12, 2017

(54) DETERMINING A BASE LOCATION OF A USER ASSOCIATED WITH A MOBILE DEVICE

(71) Applicants: AT&T INTELLECTUAL PROPERTY I, L.P., Atlanta, GA (US); AT&T Mobility II LLC, Atlanta, GA (US)

(72) Inventors: Ann E. Skudlark, San Ramon, CA (US); Olivia Hong, Bridgewater, NJ (US); Tuba Aktaran Kalayci, Johns Creek, GA (US); Amritha Joseph, Atlanta, GA (US); Christopher T. Volinsky, Morristown, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/221,578

(22) Filed: Jul. 27, 2016

(51) Int. Cl.
*H04W 4/02* (2009.01)
*H04W 8/18* (2009.01)

(52) U.S. Cl.
CPC ............. *H04W 4/028* (2013.01); *H04W 8/18* (2013.01)

(58) Field of Classification Search
CPC .................................................... H04W 4/028
See application file for complete search history.

(56) References Cited

U.S. PATENT DOCUMENTS

| 5,519,760 A | 5/1996 | Borkowski et al. |
| 5,943,658 A | 8/1999 | Gravell et al. |
| 6,044,261 A | 3/2000 | Kazmi |
| 6,115,754 A | 9/2000 | Landgren |

(Continued)

FOREIGN PATENT DOCUMENTS

WO 2014059003 4/2014

OTHER PUBLICATIONS

Frias-Martinez, Vanessa, et al. "Towards large scale technology impact analyses: Automatic residential localization from mobile phone-call data." Proceedings of the 4th ACM/IEEE international conference on information and communication technologies and development. ACM, 2010. 10 pages.

(Continued)

*Primary Examiner* — Michael T Vu
(74) *Attorney, Agent, or Firm* — Amin, Turocy & Watson, LLP

(57) ABSTRACT

A base location associated with a user of a communication device can be determined. A location identifier component can determine the base location, such as a home location, of the user based on activity data and/or other data, wherein the activity data can be obtained from base stations with which the user's communication device communicates during a defined time period. The location identifier component can designate a defined area as the base location, wherein the defined area can be associated with the base station with which the communication device most frequently communicates during the defined time period or can be an area that is determined based on the activity data and the other data, (Continued)

in accordance with a defined location algorithm. To facilitate maintaining the privacy of users, the activity data can be anonymized and/or the granularity of defining the base location can be adjusted.

20 Claims, 13 Drawing Sheets

(56) References Cited

U.S. PATENT DOCUMENTS

| | | |
|---|---|---|
| 7,035,647 B2 | 4/2006 | de Verteuil |
| 7,254,388 B2 | 8/2007 | Nam et al. |
| 7,802,291 B2 | 9/2010 | Campbell |
| 8,010,134 B2 | 8/2011 | Barnes et al. |
| 8,340,633 B1 | 12/2012 | Rege et al. |
| 8,504,070 B2 | 8/2013 | Dowlatkhah |
| 8,682,287 B2 | 3/2014 | Sennett et al. |
| 2002/0161633 A1 | 10/2002 | Jacob et al. |
| 2004/0266406 A1 | 12/2004 | Meda |
| 2006/0293065 A1 | 12/2006 | Chew et al. |
| 2009/0005066 A1 | 1/2009 | Florkey et al. |
| 2009/0149154 A1 | 6/2009 | Bhasin et al. |
| 2010/0004997 A1 | 1/2010 | Mehta et al. |
| 2010/0015926 A1 | 1/2010 | Luff |
| 2010/0223135 A1 | 9/2010 | Griffin et al. |
| 2011/0059763 A1 | 3/2011 | Yoshiuchi et al. |
| 2012/0036013 A1 | 2/2012 | Neuhaus et al. |
| 2012/0238287 A1 | 9/2012 | Scherzer et al. |
| 2013/0316741 A1 | 11/2013 | Frias Martinez et al. |
| 2015/0004999 A1* | 1/2015 | Schuler ............ H04W 64/00 455/456.1 |
| 2015/0304863 A1* | 10/2015 | Gupta ............ H04W 4/04 455/423 |

OTHER PUBLICATIONS

Isaacman, Sibren, et al. "Identifying important places in people's lives from cellular network data." Pervasive computing. Springer Berlin Heidelberg, 2011. 133-151. 18 pages.

Halepovic, Emir, and Carey Williamson. "Characterizing and modeling user mobility in a cellular data network." Proceedings of the 2nd ACM international workshop on Peiformance evaluation of wireless ad hoc, sensor, and ubiquitous networks. ACM, 2005. 8 pages.

Office Action dated Aug. 25, 2015 for U.S. Appl. No. 14/072,444, 24 pgs.

Office Action dated Jan. 6, 2015 for U.S. Appl. No. 14/072,444, 13 pgs.

Final Office Action dated Apr. 30, 2015 for U.S. Appl. No. 14/072,444, 21 pgs.

Office Action dated Jun. 3, 2016 for U.S. Appl. No. 14/072,444, 17 pgs.

Final Office Action dated Feb. 1, 2016 for U.S. Appl. No. 14/072,444, 16 pgs.

Final Office Action dated Dec. 23, 2016 for U.S. Appl. No. 14/072,444, 44 pages.

Office Action dated Mar. 29, 2017 for U.S. Appl. No. 14/072,444, 42 pages.

\* cited by examiner

DETERMINING A BASE LOCATION OF A USER ASSOCIATED WITH A MOBILE DEVICE

TECHNICAL FIELD

This disclosure relates generally to network communications, e.g., to determining a base location of a user associated with a mobile device.

BACKGROUND

Users (e.g., subscribers) associated with communication devices, such as mobile devices, usually have subscriptions related to the use of such communication devices with a service provider. For a subscription associated with a user, a billing address, which is an address to which the billing for the subscription is sent by the service provider, is typically associated with the account of the user with the service provider. In many cases, the billing address associated with the account is the home address of the user. However, there are many other instances where the billing address associated with the account is not the home address of the user. For example, a user (e.g., college student, child, elderly parent) of a communication device associated with a subscription may live in a different location than the billing address associated with the account. Also, some billing addresses associated with subscriptions merely may be postal mail box addresses associated with users. The above-described description is merely intended to provide a contextual overview of wireless communication networks, and is not intended to be exhaustive.

DETAILED DESCRIPTION

Figure 1:
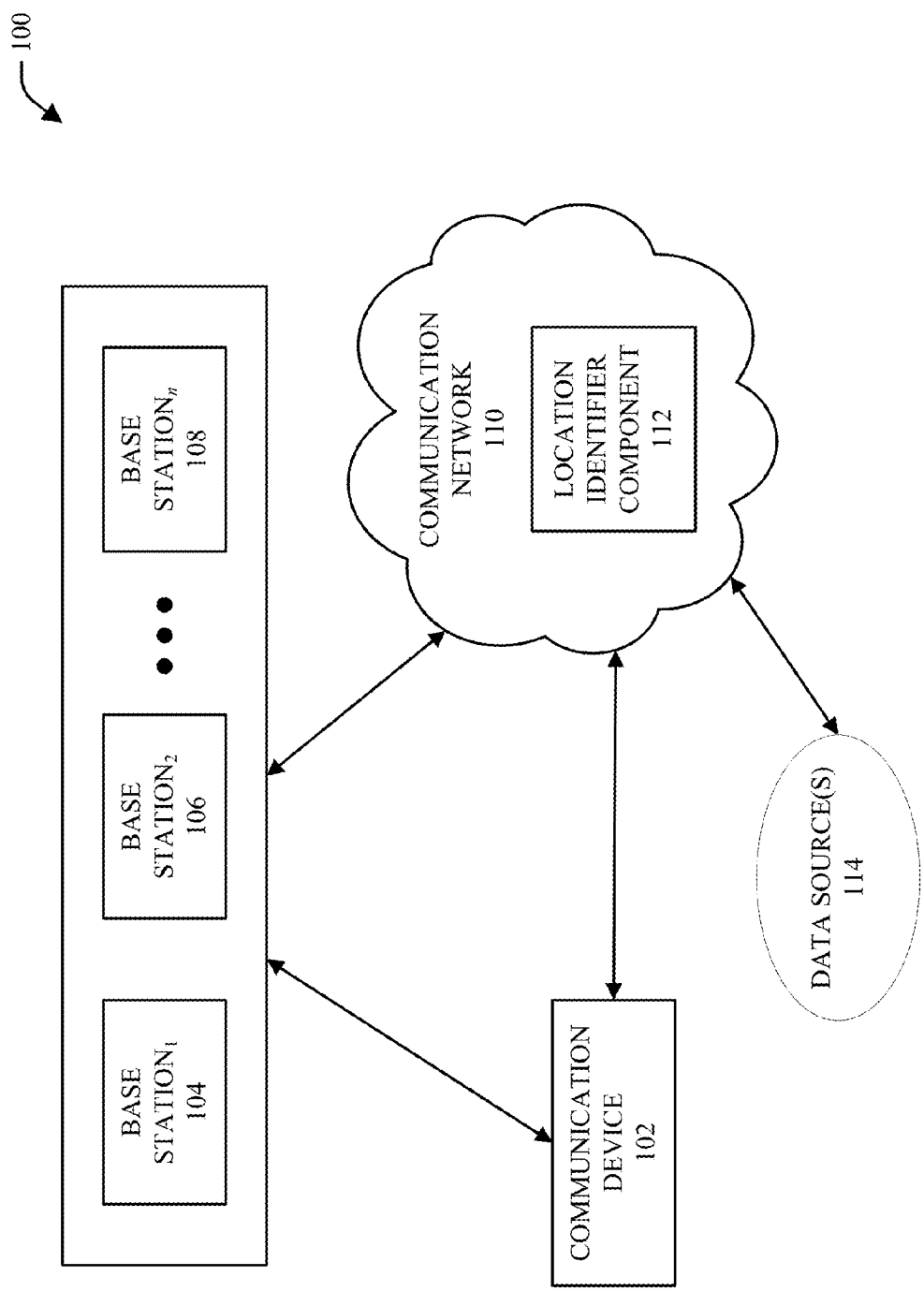
FIG. 1 illustrates a block diagram of an example system that can facilitate determining a base location (e.g., home location) of a user associated with a communication device, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Users (e.g., subscribers) associated with communication devices (e.g., wireless communication devices), such as mobile phones, electronic tablets, electronic gaming devices, a communication device integrated with a vehicle (e.g., connected vehicle), and computers (e.g., laptop computers), usually have subscriptions related to the use of such communication devices with a service provider that can provide communication services to the users. For a subscription associated with a user (e.g., subscriber), a billing address, which can be an address to which the billing for the subscription is sent by the service provider, is typically associated with the account of the user with the service provider.

In many cases, the billing address associated with the account is the home address of the user. Customer billing address records can be used to facilitate determining a home address of a user. However, using a billing address record to determine a home address of a user can be unreliable because the address contained in the billing address record of the user may merely represent the place where the user's bill is sent, as opposed to the home street address where the user resides. The user may live in a different location than the billing address associated with the billing address record associated with the user and/or another user(s) associated with the account (e.g., another user(s) with another communication device(s) that receives a communication service(s) via the subscription associated with the user) may live in a different location than the billing address associated with the billing address record and/or a different location than the user (e.g., account holder). Consequently, there can be many other instances where the billing address associated with the account is not the home address of the user. For example, a user (e.g., college student, child, elderly parent) of a communication device associated with a subscription may live in a different location than the billing address associated with the account. Also, some billing addresses associated with subscriptions merely may be postal mail box addresses associated with users.

Techniques for determining a base location (e.g., a home location) associated with a user of a communication device are presented. A location identifier component can determine the base location (e.g., the home location) of the user based at least in part on activity data (e.g., base-station data) and/or other data, such as data from call detail records (CDRs) or identified (e.g., registered) address data (e.g., obtained from a demographic data provider), wherein the activity data can be obtained from base stations with which the user's communication device communicates during a defined time period. Based at least in part on the results of the analysis of the activity data and/or the other data, the location identifier component can designate a defined area as the base location, wherein the defined area can be associated with (e.g., within a coverage area of, or in proximity to) the base station with which the communication device most frequently communicates (e.g., in connection with voice communication, data communication, or text or multimedia messaging communication), relative to other base stations, during the defined time period or can be an area that is determined based at least in part on the activity data and the other data, in accordance with a defined location algorithm.

To facilitate determining the base location associated with a user, the location identifier component can aggregate and respectively weight different types of usage (e.g., voice communications, data communications, messaging communications) associated with the communication device. For example, as more fully described herein, the location identifier component can apply a first weight to first parameter values associated with a first portion of activity data that relates to voice communications associated with a communication device of the user to generate first weighted activity data, can apply a second weight to second parameter values associated with a second portion of the activity data that relates to data communications associated with the communication device to generate second weighted activity data, and can apply a third weight to third parameter values associated with a third portion of the activity data that relates to messaging communications (e.g., short message service (SMS), multimedia messaging service (MMS)) associated with the communication device to generate third weighted activity data, in accordance with the defined location algorithm. The location identifier component can determine the base location or at least a potential base location associated with the user based at least in part on the first weighted activity data, the second weighted activity data, and the third weighted activity data (and/or other data, such as registered address data).

In some implementations, to facilitate maintaining the privacy of users, the location identifier component or another component can anonymize the activity data (e.g., base station data) and/or can adjust the granularity of defining the base location (e.g., can adjust the granularity of defining the base location such that the defined area is an area associated with a postal (e.g., zip) code, or can adjust the granularity of defining the base location such that the defined area is a coverage area of the base station within which the user resides or is at least determined or predicted to reside).

In certain implementations, the location identifier component can augment and/or leverage user (e.g., customer) metadata, such as data available from post-paid accounts associated with users who have post-paid accounts in connection with the services (e.g., wireless communication services) they receive from the service provider, to facilitate providing insights on usage patterns of other users (e.g., customers who have pre-paid accounts for wireless communication services and/or communication devices) for whom limited or no metadata is available in connection with such services.

These and other aspects and embodiments of the disclosed subject matter will now be described with respect to the drawings.

Referring now to the drawings, FIG. 1 illustrates a block diagram of an example system 100 that can facilitate determining a base location (e.g., home location) of a user associated with a communication device, in accordance with various aspects and embodiments of the disclosed subject matter. The system 100 can comprise a communication device 102 (e.g., mobile and/or wireless communication device, such as a mobile phone, electronic notebook, electronic pad or tablet, electronic gaming device, personal digital assistant (PDA), computer, set-top box, a vehicle (e.g., connected vehicle) comprising a communication device, etc.) that can operate and communicate in a communication network environment. At various times, the communication device 102 can be communicatively connected via a wireless communication connection(s) to one or more base stations, such as, for example, base station$_1$ 104, base station$_2$ 106, and/or (e.g., up through) base station$_n$ 108, to communicatively connect the communication device 102 to a communication network(s) 110 to enable the communication device 102 to communicate with other communication devices (not shown) associated with (e.g., communicatively connected to) the communication network(s) 110 in a communication network environment.

The communication network 110 can comprise one or more wireline communication networks and one or more wireless communication networks, wherein the one or more wireless communication networks can be based at least in part on one or more various types of communication technology or protocols, such as, for example, 3G, 4G, or x generation (xG) network, where x can be virtually any desired integer or real value; wi-fi; etc. The communication network 110 (e.g., a core network, or a network comprising a core network and/or an IP-based network) can facilitate routing voice and data communications between a communication device(s) (e.g., communication device 102) and other communication devices (e.g., remote communication device) associated with the communication network 110 in the communication network environment. The communication network 110 also can allocate resources to the communication device 102 or other communication devices in the communication network 110, convert or enforce protocols, establish and enforce quality of service (QOS) for the communication devices (e.g., communication device 102), provide applications or services in the communication network 110, translate signals, and/or perform other desired functions to facilitate system interoperability and communication in the communication network 110 (e.g., wireless portion of the communication network 110 or wireline portion of the communication network 110). The communication network 110 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices (e.g., communication device 102) in the communication network environment.

As the communication device 102 is moved through a wireless communication network environment, at various times, the communication device 102 can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., UE functioning as a mobile hotspot)), such as base station$_1$ 104, base station$_2$ 106, and/or base station$_n$ 108, that can operate in the wireless communication network environment. An AP (e.g., base station$_1$ 104, base station$_2$ 106, base station$_n$ 108) can serve a specified coverage area to facilitate communication by the communication device 102 or other communication devices in the wireless communication network environment. An AP (e.g., base station$_1$ 104, base station$_2$ 106, base station$_n$ 108) can serve a respective coverage cell (e.g., macrocell, femtocell, picocell, etc.) that can cover a respective specified area, and the AP can service mobile wireless devices, such as the communication device 102, located in the respective area covered by the respective cell, where such coverage can be achieved via a wireless link (e.g., uplink (UL), downlink (DL)). When an attachment attempt is successful, the communication device 102 can be served by the AP (e.g., base station$_1$ 104, base station$_2$ 106, base station$_n$ 108) and incoming voice and data traffic can be paged and routed to the communication device 102 through the AP, and outgoing voice and data traffic from the communication device 102 can be paged and routed through the AP to other communication devices (e.g., another UE) in the communication network environment. In an aspect, the communication device 102 can be connected and can communicate wirelessly using virtually any desired wireless technology, including, for example, cellular, wi-fi, wi-max, wireless local area networks (WLAN), etc.

The disclosed subject matter can employ techniques to facilitate determining a base location (e.g., a home location) associated with a user of the communication device 102 and the base locations of other users of other communication devices. The system 100 can comprise a location identifier component 112 that can determine the base location of the user (e.g., the home location where the user resides) based at least in part on activity data (e.g., base station data) and/or other data, such as demographic data (e.g., registered address and/or postal code data maintained by a demographic data provider or source, such as Acxiom or another entity that provides demographic data services) and/or data from CDRs.

The activity data can comprise information regarding the respective frequencies of communication that the communication device 102 has had with respective base stations (e.g., base station$_1$ 104, base station$_2$ 106, and/or base station$_n$ 108) associated with the communication network 110 and the respective times of such communications of the communication device 102 with the respective base stations. For instance, with respect to each base station with which the communication device 102 has been in communication for a given period of time, the activity (e.g., base station) data can comprise information regarding the number of voice calls initiated or received by the communication device 102, the length of time of such voice calls, the number of data sessions (e.g., Internet communications, email communications, application-related communications) of the communication device 102, the length of time of such data sessions, the number of messages (e.g., SMS, MMS) sent or received by the communication device 102, and/or respective signaling, messages, or pings between the communication device 102 and the respective base stations. The activity data can be anonymized, as desired.

It is to be appreciated and understood that, in some implementations, to facilitate maintaining and protecting the privacy of users of communication devices and their data, users of communication devices can be asked if they want to "opt in" to certain services, applications, or programs that would allow the location identifier component 112, another component (e.g., a network component of the communication network 110), and/or a network entity (e.g., network provider or carrier) to access certain information (e.g., potentially personal or sensitive information) of users from their communication devices or other sources (e.g., sources, such as an application or a server, associated with their communication devices). For instance, a default option can be that a user "opts out" of such services, applications, or programs that would allow the location identifier component 112, other component, and/or network entity to access such certain information of users from their communication devices or the other sources. If the user decides and consents to "opt in" to all or a portion of such certain services, applications, or programs, the location identifier component 112, other component, and/or network entity can access all or a user-authorized portion (e.g., only the portion for which the user has decided to "opt in") information relating to, for example, transit vectors, movement, or location associated with and obtained from the communication device of the user, and/or an application used by the communication device, wherein such information can or may be used, for example, to determine a base location associated with the user of the communication device, to identify, create, and/or present advertisements that may be of interest to the user of the communication device, or for other desired purposes, in accordance with the authorization of the user to use such information (e.g., when the user decides to "opt in" or at another time that the user authorizes the use of such information).

The demographic data can comprise, for example, data from a data source(s) 114, such as a demographic data source (e.g., Acxiom or other entity that can provide demographic data services), that can provide or indicate respective street address data (e.g., registered household address data, such as street address, city, state, and/or postal code (e.g., zip code)) of respective entities (e.g., individual users, businesses). The demographic data can be more highly granularized (e.g., to the level of a particular neighborhood) or can be less highly granularized (e.g., to the level of a defined area, such as an area covered by a base station, an area associated with a postal code, or another defined region). The demographic data also can be anonymized, as desired.

The location identifier component 112 can receive (e.g., obtain) the activity data from base stations (e.g., base station$_1$ 104, base station$_2$ 106, and/or base station$_n$ 108) with which the user's communication device 102 communicates, for example, during a defined time period. The location identifier component 112 can analyze the activity data and/or the other data. Based at least in part on the results of the analysis of the activity data and/or the other data (e.g., registered address data, CDR data), the location identifier component 112 can designate a defined area (e.g., an area associated with a postal code, such as a zip code, a coverage area of a base station, or other defined area) as the base location (e.g., home location) of the user. For example, based at least in part on the results of the analysis of the activity data and/or the other data, the location identifier component 112 can designate a defined area as the base location of the user, wherein the defined area can be associated with (e.g., within a coverage area of, or in proximity to) the base station (e.g., base station$_1$ 104, base station$_2$ 106, or base station$_n$ 108) with which the communication device 102 most frequently communicates (e.g., in connection with voice communication, data communication, application communication, or text or multimedia messaging communication), relative to respective frequencies of communications of the communication device 102 with other base stations (e.g., other of the base station$_1$ 104, base station$_2$ 106, or base station$_n$ 108), during the defined time period or can be an area that can be determined based at least in part on the activity data and the other data, in accordance with a defined location algorithm.

The location identifier component 112 can determine or calculate the frequency of communications of the communication device 102 with a particular base station (e.g., base station$_1$ 104, base station$_2$ 106, or base station$_n$ 108) based at least in part on communication characteristics relating to the communications between the communication device 102 and base station, wherein the communication characteristics can comprise a type of communication (e.g., phone call, online data session, email, application communication, text message, multimedia message, signaling, pinging), the number of communications of a particular type (e.g., number of phone calls, number of emails, number of text messages), length of a communication of a particular type (e.g., length of a phone call). The location identifier component 112 can respectively weight the respective communication characteristics, for example, as more fully disclosed herein, wherein the location identifier component 112 can determine the frequency of communications of the communication device 102 with a particular base station based at least in part on the activity data relating to the respective communications between the communication device and the particular base station and the respectively weighted communication characteristics associated with the respective communications contained in the activity data associated with the communication device 102.

In some implementations, the location identifier component 112 can adjust the location of the base location associated with a user (or group of users) from a first location to a second location based at least in part on registered address data associated with the user (or group of users) that can be obtained from a demographic data provider, in accordance with the defined location criteria (e.g., when doing so is in accordance with applicable defined location criteria). For instance, the location identifier component 112 can determine (e.g., automatically or dynamically determine) that a base location associated with a base station (e.g., the base station$_1$ 104) can be a first potential base location, based at least in part on the base station being the one with which the communication device 102 most frequently communicates (e.g., in connection with voice communication, data communication, or text or multimedia messaging communication), relative to respective frequencies of communications of the communication device 102 with other base stations (e.g., base station$_2$ 106 or base station$_n$ 108), during the defined time period.

The location identifier component 112 can receive the demographic data (e.g., registered address data associated with users) from one or more data sources 114 (e.g., a demographic data provider, such as Axciom). The demographic data can comprise data, such as registered address data associated with a user, which can indicate a potential base location (e.g., home street address, city, state, postal code) of the user. The location identifier component 112 can use the demographic data, for example, to validate or verify that the first potential base location is the base location associated with a user or to facilitate adjusting or determining the base location associated with the user. The demographic data can be or can comprise, for example, data relating to users that can be obtained in connection with post-paid accounts of users who have subscriptions for communication services from service providers (e.g., wireless communication service providers). The location identifier component 112 can analyze the demographic to determine whether the user is listed in such data, and, if so, can identify address information (e.g., a registered street address, city, state, postal code) associated with the user. The location identifier component 112 can determine that this address information is, or can designate this address information as, a second potential base location of the user.

The location identifier component 112 can determine (e.g., calculate) the distance (e.g., geographical distance) between the first potential base location and the second potential base location associated with the user. Depending on the application or use of the information (e.g., activity information, demographic data) relating to the user and/or relating to the base location associated with the user, it may be desirable (e.g., to an entity, such as an advertiser) to move or adjust the base location from the first potential base location, which was determined by the location identifier component 112 based at least in part on the activity data associated with the communication device 102, to the second potential base location, which was determined by the location identifier component 112 based at least in part on the demographic data, for example, if the second potential base location is located sufficiently close enough to the first potential base location.

For example, with regard to a concert that the user of the communication device 102 is attending, an entity (e.g., advertiser) may desire that a base location adjustment be made from the first potential base location to the second potential base location if the second potential base location is located 3 miles or less away from the first potential base location, but the base location should remain at the first potential base location if the distance between the second potential base location and the first potential base location is more than 3 miles. As another example, another entity (e.g., another advertiser or marketer), in connection with an application or use relating to a retail sales event at a store, may desire that a base location adjustment be made from the first potential base location to the second potential base location if the second potential base location is located 5 miles or less (or even 10 or 20 miles) away from the first potential base location, but the base location should remain at the first potential base location if the distance between the second potential base location and the first potential base location is more than 5 miles (or 10 or 20 miles, as applicable).

The location identifier component 112 can evaluate the distance between the first potential base location and the second potential base location associated with the user based at least in part on a distance parameter (e.g., an applicable distance parameter) relating to an application or use of the information (e.g., demographic data, such as registered address data) associated with the user and/or relating to the base location associated with the user, in accordance with the defined location criteria, which can specify which distance parameter is applicable for the application or use of the information (e.g., demographic data) associated with the user and/or relating to the base location associated with the user (e.g., by an entity(ies)).

The location identifier component 112 can determine or select the base location associated with the user based at least in part on the evaluation result and the distance parameter relating to the application or use of the information relating to the user or the base location associated with the user, in accordance with the defined location criteria, wherein the evaluation result can indicate that the originally determined base location (e.g., the first potential base location) is to be the base location associated with the user, or the base location is to be adjusted such that the second potential base location is determined and/or selected to be the base location associated with the user.

With respect to a first set of entities, the location identifier component 112 can determine that the base location associated with the user is to be the first potential base location with regard to a first set of applications or uses, and with respect to a second set of entities, the location identifier component 112 can determine that the base location associated with the user is to be the second potential base location with regard to a second set of applications or uses. The respective base locations associated with the user can be employed concurrently by the location identifier component 112, with the location identifier component 112 employing the appropriate base location associated with the user based at least in part on the intended application or use of the information relating to the user or the base location associated with the user, in accordance with the defined location criteria.

In certain implementations, the location identifier component 112 can determine the defined time period based at least in part on activity data associated with the user and/or other users, or the other data (e.g., demographic data, such as registered address data, CDR data), in accordance with defined location criteria. For instance, the location identifier component 112 can determine the defined time period to be a period of time when the user of the communication device 102 is most likely to be home on a particular night (e.g., the user is likely to be home between 7 p.m. and 7 a.m. during the work week from Monday through Thursday (or Friday); the user is likely to be home between 10 p.m. and 6 a.m. during the week; or the user is likely to be home between 5:30 p.m. and 8 p.m. on Friday and Saturday evenings; . . . ) based on the activity data associated with the communication device 102 of the user and/or the other data, in accordance with the defined location criteria, wherein the activity data can indicate the user uses the communication device 102 more frequently during that period of time and/or the demographic data (e.g., registered address data) can indicate that user may reside at a home in the defined area (e.g., wherein activity data during that period of time supports or corroborates the indication of the demographic data that the user may reside at a home in the defined area).

In some implementations, the location identifier component 112 can select and/or set the defined time period to be and/or at an initial or default time period(s) based at least in part on, for example, demographic data and/or other data regarding the user (e.g., data indicating employment or possible employment of the user that is associated with a subscription account of the user for communication services). The location identifier component 112 can monitor and evaluate activity data associated with the communication device 102 and/or other data (e.g., demographic data), and, if and as appropriate, the location identifier component 112 can adjust (e.g., dynamically adjust or modify) the defined time period to a different defined time period, in accordance with the defined location criteria. This can occur, for example, when the location identifier component 112 determines that a current defined time period is not indicative or is less indicative of a period of time when the user is or can be expected (e.g., predicted) to be home than the adjusted defined time period, which is determined by the location identifier component 112 to be more indicative (e.g., most indicative) of the period of time that the user is or can expected to be home.

In accordance with other implementations, to facilitate determining the base location associated with a user, the location identifier component 112 can aggregate and respectively weight different types of usage (e.g., voice communications, data communications, messaging communications) associated with the communication device 102, as more fully disclosed herein. For example, the location identifier component 112 can apply a first weight (e.g., a first weighting value) to first parameter values associated with a first portion of activity data that relates to voice communications (e.g., a first communication characteristic) associated with the communication device 102 of the user to generate first weighted activity data, can apply a second weight (e.g., a second weighting value) to second parameter values associated with a second portion of the activity data that relates to data communications (e.g., a second communication characteristic) associated with the communication device 102 to generate second weighted activity data, and can apply a third weight (e.g., a third weighting value) to third parameter values associated with a third portion of the activity data that relates to messaging (e.g., SMS, MMS) communications (e.g., a third communication characteristic) associated with the communication device 102 to generate third weighted activity data, in accordance with the defined location algorithm. The location identifier component 112 can determine the base location associated with the user based at least in part on the first weighted activity data, the second weighted activity data, and the third weighted activity data (and/or other data (e.g., demographic data, such as registered address data)).

It is to be appreciated and understood that the location identifier component 112 can apply other weighting to other types of communications (e.g., communications with other communication characteristics) of the communication device 102 with respective base stations (e.g., base station$_1$ 104, base station$_2$ 106, or base station$_n$ 108), and can use such other weighting to facilitate determining the base location associated with the user. For example, the location identifier component 112 can apply a particular weighting value to parameter values relating to another type(s) of communication (e.g., signaling, messages, or pings) between the communication device 102 and respective base stations.

In some implementations, to facilitate maintaining the privacy of users, the location identifier component 112 or another component can anonymize the activity data (e.g., base station data) and/or can adjust the granularity of defining the base location(s) associated with the user(s) of the communication device(s) (e.g., can adjust the granularity of defining the base location such that the defined area is an area associated with a postal code, or can adjust the granularity of defining the base location such that the defined area is a coverage area of the base station within which the user resides or is at least determined or predicted to reside).

In other implementations, the location identifier component 112 also can augment, extrapolate, and/or leverage user (e.g., customer) metadata, such as data available from post-paid accounts associated with users who have post-paid accounts in connection with the services (e.g., wireless communication services) they receive from the service provider, to facilitate providing insights on usage patterns of other users (e.g., customers who have pre-paid accounts for wireless communication services and/or communication devices) for whom limited or no metadata is available in connection with such services. For example, the location identifier component 112 can analyze activity data, demographic data, or other data (e.g., metadata) associated with users who have post-paid accounts with a service provider(s). The location identifier component 112 also can analyze data, if any, associated with other users who have pre-paid accounts for communication services, wherein such data associated with the other users can comprise, for example, purchase data relating to the purchase of the communication device or pre-paid communication services, type (e.g., manufacturer and model) of communication device, functions (e.g., phone functions, data or online functions, messaging functions) of the communication device, demographic data relating to the other users, and/or activity data relating communications of communication devices of the other users with base stations. Based at least in part on the results of the analysis of data associated with communication devices (e.g., 102) and associated users who have post-paid accounts and data (if any) of other communication devices and associated other users who have pre-paid accounts, the location identifier component 112 can determine, predict, or estimate a base location (e.g., home location) associated with a user who has a pre-paid account.

Knowing the area (e.g., postal code, street address, coverage area associated with a base station) where a user of a communication device (e.g., 102) resides, when authorized (e.g., by the user), can be useful, for example, to various entities, such as advertisers and marketers. A user of a communication device (e.g., 102) can decide or consent to, and to the extent that the user has decided and consented to, "opt in" to allow the location identifier component 112, the communication network 110, a network provider associated with the communication network 110, and/or an advertiser or a marketer to access information associated with the user, including the communication device of the user, to enable one or more of these entities (e.g., the location identifier component 112, the communication network 110, a network provider associated with the communication network 110, and/or an advertiser or a marketer) to know the area (e.g., postal code, street address, coverage area associated with a base station) where the user of the communication device (e.g., 102) resides or at least can potentially reside. Advertisers, for instance, may like to know where communication device users reside to facilitate targeting advertisements to the communication device users. For example, at various events or places, such as sporting events, concerts, shopping locations (e.g., mall or other retail store locations, for instance, in connection with retail store special promotions), advertisers may like to know where the communication device users reside to facilitate tailoring and targeting advertisements to such users.

As another example, by knowing the area where a user of a communication device resides, and/or having information (e.g., via the location identifier component 112) regarding where the user travels (e.g., between home and work), for example, where the user travels on a frequent basis, the location identifier component 112 or another component can determine or predict the routing path (e.g., travel path) that the user will or may take. Based at least in part on this information regarding the routing path on which the user is or may be traveling, advertisers can tailor and target advertisements (e.g., billboard or sign advertisements) towards that user (or a group of users) (e.g., can determine or decide what advertisements may most attract their target customers) traveling along the route the user (or group of users) is or may be traveling, for example, during a certain time period (e.g., rush hour; a period of time before or after an event, such as a concert, sporting event, or sales event).

The disclosed subject matter can thereby facilitate targeting or enhancing advertising, enhancing (e.g., improving, maximizing) the effectiveness of advertisements, optimizing inventory management, enhancing (e.g., improving, maximizing) return on investment of advertising (e.g., out-of-home advertising), and evaluation of retail store sites, for advertisers, marketers, and/or other entities.

Figure 2:
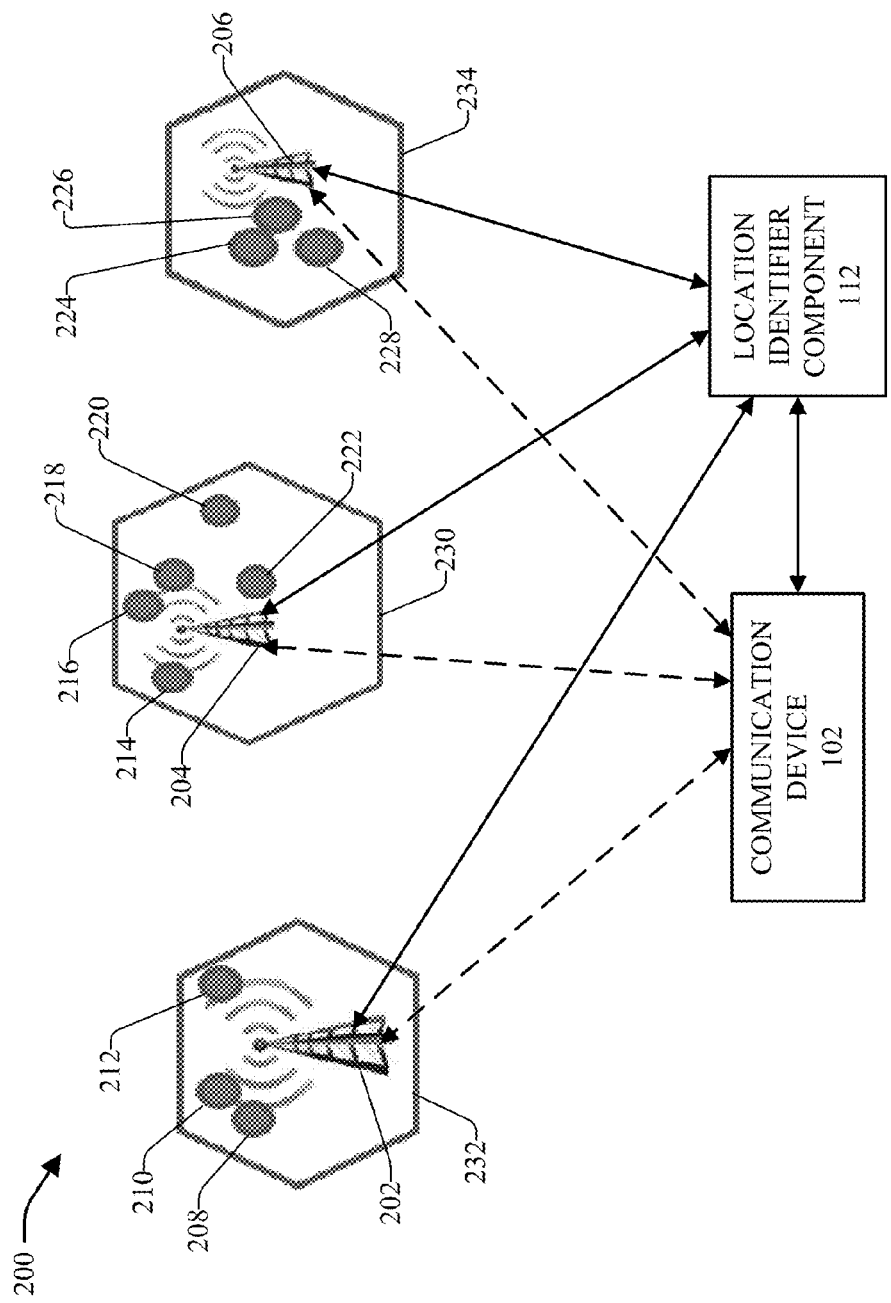
FIG. 2 illustrates a diagram of another example system that can facilitate determining a base location (e.g., home location) of a user associated with a communication device, in accordance with various aspects and embodiments of the disclosed subject matter.

Turning briefly to FIG. 2, FIG. 2 illustrates a diagram of another example system 200 that can facilitate determining a base location (e.g., home location) of a user associated with a communication device, in accordance with various aspects and embodiments of the disclosed subject matter. The system 200 can comprise the communication device 102, the location identifier component 112, base station$_1$ 202, base station$_2$ 204, and base station$_n$ 206. The respective components (e.g., communication device 102, the location identifier component 112, base station$_1$ 202, base station$_2$ 204, and base station$_n$ 206) can comprise respective features and functions, such as more fully described herein.

The location identifier component 112 can receive and analyze activity data associated with the communication device 102 relating to communications between the communication device 102 and the base stations, base station$_1$ 202, base station$_2$ 204, and base station$_n$ 206, in the communication network environment, during a defined time period indicative of a time period where the user(s) can be expected (e.g., can be predicted) to be at a base (e.g., home) location. The location identifier component 112 can identify the respective communications (e.g., communication events), such as communication events 208, 210, and 212, between the communication device 102 and the base station$_1$ 202. The location identifier component 112 also can identify the respective communications (e.g., communication events), such as communication events 214, 216, 218, 220, and 222, between the communication device 102 and the base station$_2$ 204. The location identifier component 112 further can identify the respective communications (e.g., communication events), such as communication events 224, 226, and 228, between the communication device 102 and the base station$_n$ 206.

Based at least in part on the results of the analysis of the activity data and the resulting identification of the respective communications between the communication device 102 and the base stations, the location identifier component 112 can determine that the communication device 102 of the user has the highest frequency of communication with the base station$_2$ 204 during the defined time period. In some implementations, the location identifier component 112 can determine or designate a defined area 230 (e.g., area associated with a postal code, coverage area of the base station$_2$ 204) associated with the base station$_2$ 204 as the base (e.g., home) location of the user. In other implementations, the location identifier component 112 can perform further analysis, for example, of other data, such as demographic data relating to the user, wherein the demographic data can indicate a potential base location (e.g., street address, city, state, postal code) of the user, and can determine whether to adjust the base location associated with the user to another defined area (e.g., area 232 or area 234) based at least in part on results of the analysis of the activity data associated with the communication device 102 and the analysis of the other data (e.g., demographic data), as more fully disclosed herein.

Figure 3:
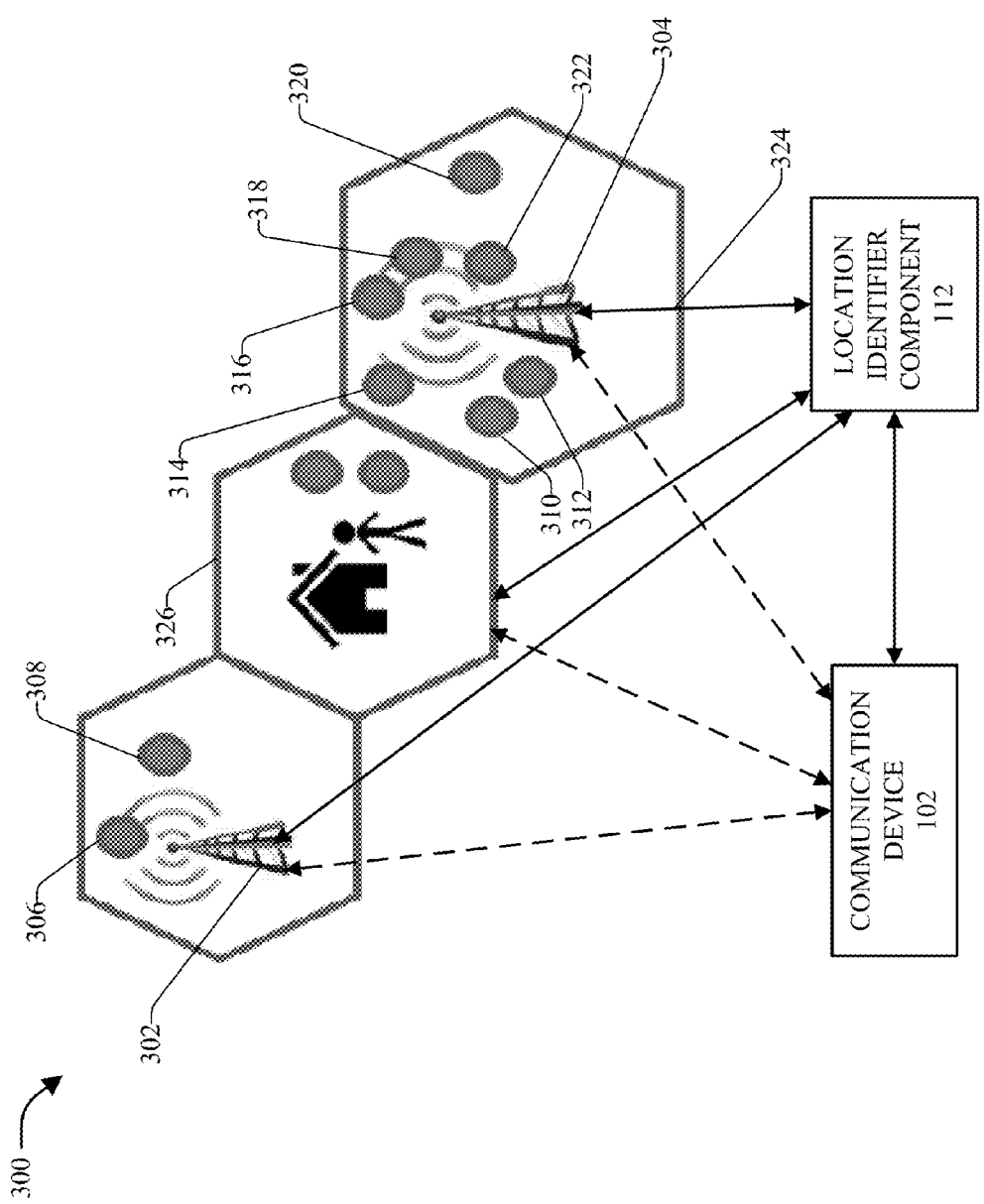
FIG. 3 presents a diagram of yet another example system that can facilitate determining a base location (e.g., home location) of a user associated with a communication device, in accordance with various aspects and embodiments of the disclosed subject matter.

FIG. 3 presents a diagram of yet another example system 300 that can facilitate determining a base location (e.g., home location) of a user associated with a communication device, in accordance with various aspects and embodiments of the disclosed subject matter. The system 300 can comprise the communication device 102, the location identifier component 112, base station$_1$ 302 and base station$_2$ 304. The respective components (e.g., communication device 102, the location identifier component 112, base station$_1$ 302 and base station$_2$ 304) can comprise respective features and functions, such as more fully described herein.

The location identifier component 112 can receive and analyze activity data associated with the communication device 102 relating to communications between the communication device 102 and the base stations, base station$_1$ 302 and base station$_2$ 304, in the communication network environment, during a defined time period indicative of a time period where the user(s) can be expected (e.g., can be predicted) to be at a base (e.g., home) location. The location identifier component 112 can identify the respective communications (e.g., communication events), such as communication events 306, and 308, between the communication device 102 and the base station$_1$ 302. The location identifier component 112 also can identify the respective communications (e.g., communication events), such as communication events 310, 312, 314, 316, 318, 320, and 322, between the communication device 102 and the base station$_2$ 304.

Based at least in part on the results of the analysis of the activity data and the resulting identification of the respective communications between the communication device 102 and the base stations, the location identifier component 112 can determine that the communication device 102 of the user has the highest frequency of communication with the base station$_2$ 304 during the defined time period. As the communication device 102 of the user has the highest frequency of communication with the base station$_2$ 304 during the defined time period, the location identifier component 112 can determine that a defined area 324 (e.g., area associated with a postal code, coverage area of the base station$_2$ 304) associated with the base station$_2$ 304 can at least be a potential base (e.g., home) location associated with the user. There can some instances though where the base location associated with the user can be another defined area, such as defined area 326.

To facilitate determining whether the base location associated with the user is to be adjusted from the defined area 324 that was determined based at least in part on the activity data to another defined area (e.g., defined area 326), the location identifier component 112 can perform further analysis, for example, of other data, such as demographic data relating to the user, wherein the demographic data can indicate a potential base location (e.g., street address, city, state, postal code) of the user, and can determine whether to adjust the base location associated with the user to another defined area 326 (even though the frequency of communications of the communication device 102 of the user with respect to the other defined area 326 is lower than the frequency of communications of the communication device 102 of the user with respect to the defined area 324), based at least in part on results of the analysis of the activity data associated with the communication device 102 and the analysis of the other data (e.g., demographic data), as more fully disclosed herein. For example, based at least in part on the analysis of the other data (e.g., demographic data), the location identifier component 112 can determine or identify the other defined area 326 as being another potential base location associated with the user. The location identifier component 112 can determine (e.g., measure, calculate) the distance between the defined area 324 associated with the base station$_2$ 304 and the other defined area 326, and can evaluate such distance with respect to the application or use for the data relating to the user or base location associated with the user, in accordance with the defined location criteria, wherein the defined location criteria can comprise a distance parameter that can indicate a distance range for adjusting a base location for a particular application or use for the data relating to the user or base location associated with the user.

The location identifier component 112 can determine whether to adjust the base location from the defined area 324 to the other defined area 326 based at least in part on the distance between the defined area 324 and the other defined area 326 and the distance parameter, in accordance with the defined location criteria. For instance, if the distance between the defined area 324 to the other defined area 326 is less than or equal to the applicable distance parameter, the location identifier component 112 can determine that the base location is to be adjusted from the defined area 324 to the other defined area 326. If the distance between the defined area 324 to the other defined area 326 is greater than the applicable distance parameter, the location identifier component 112 can determine that the base location is not to be adjusted from the defined area 324 to the other defined area 326, but rather is to remain at the defined area 324.

Figure 4:
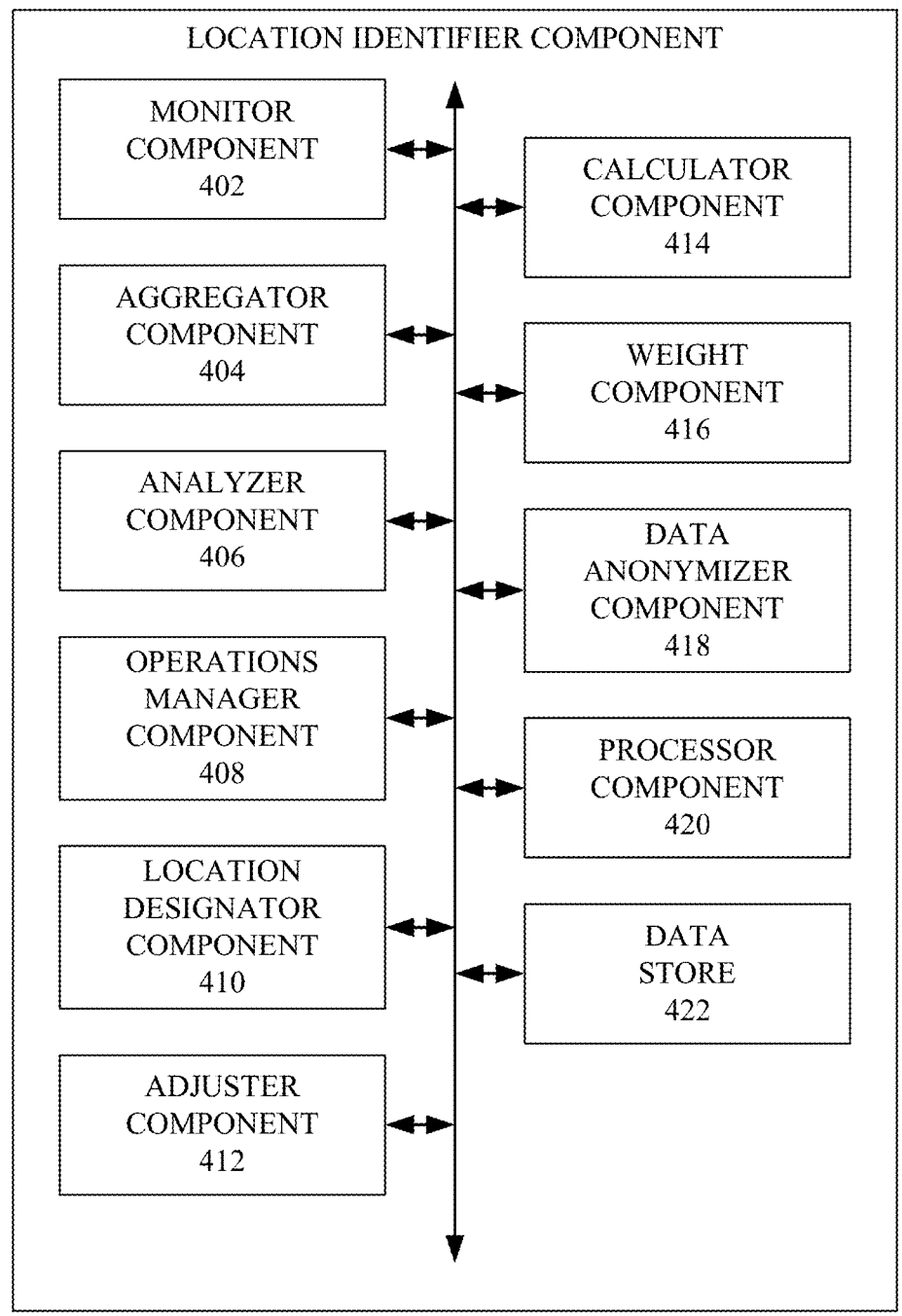
FIG. 4 depicts a block diagram of an example location identifier component, in accordance with various aspects and embodiments of the disclosed subject matter.

FIG. 4 depicts a block diagram of an example location identifier component 400, in accordance with various aspects and embodiments of the disclosed subject matter. The location identifier component 400 can be employed to facilitate determining a base location (e.g., home location) of a user associated with a communication device, in accordance with defined location criteria.

The location identifier component 400 can comprise a monitor component 402 that can monitor activity, behavior, and/or traffic flows (e.g., voice or data traffic flows, signaling, pinging) associated with communication devices and base stations in a communication network environment. The monitor component 402 also can monitor or identify signal strength for communication devices and base stations associated with the communication network.

The location identifier component 400 also can include an aggregator component 404 that can aggregate data received (e.g., obtained) from various entities (e.g., monitor component 402 or another component(s) of the location identifier component 400, communication network, application, a server or other communication device, processor, data store, etc.). The aggregator component 404 can correlate respective items of data (e.g., activity data) based at least in part on type of data (e.g., voice data, messaging data, Internet-related data, application-related data, signaling, pinging), a type of communication between a communication device and a base station, source of the data, time or date that the data was generated or received, etc., to facilitate analyzing of the data by the analyzer component 406. For example, the aggregator component 404 can aggregate data (e.g., activity data) relating to respective communications (e.g., communication events) between a communication device of a user and respective base stations associated with the communication network to facilitate determining a base (e.g., home) location associated with the user.

The location identifier component 400 can comprise the analyzer component 406, which can analyze data (e.g., activity data, demographic data, CDR data) to facilitate determining a base location associated with a user of a communication device, adjusting a base location associated with a user from one potential base location to another potential base location, and/or leverage known data associated with users (e.g., users who have post-paid accounts for communication services) to make determinations or identifications (e.g., identify a base location associated with a user who has a pre-paid account for communication services) regarding other users (e.g., users who have pre-paid accounts for communication services) for which little or no data is available.

In accordance with various implementations, the location identifier component 400 also can comprise an operations manager component 408, a location designator component 410, an adjuster component 412, a calculator component 414, a weight component 416, and a data anonymizer component 418. The respective components (e.g., operations manager component 408, location designator component 410, adjuster component 412, calculator component 414, weight component 416, data anonymizer component 418) can comprise the respective features and functions, such as more fully described herein (e.g., including as more fully described herein with regard to the location identifier component).

The operations manager component 408 can control (e g, manage) operations associated with the location identifier component 400. For example, the operations manager component 408 can facilitate generating instructions to have components of the location identifier component 400 perform operations, and can communicate respective instructions to respective components (e.g., monitor component 402, aggregation component 404, analyzer component 406, . . . ) of the location identifier component 400 to facilitate performance of operations based at least in part on the instructions, in accordance with the defined location criteria and associated algorithms (e.g., defined location algorithm, adjustment algorithm). The operations manager component 408 also can facilitate controlling data flow between the respective components of the location identifier component 400 and controlling data flow between the location identifier component 400 and another component(s) associated with (e.g., connected to) the location identifier component 400.

The location designator component 410 can determine or designate a defined area as a base location associated with a user of a communication device based at least in part on activity data associated with the communication device, for example, over a defined time period, and/or other data (e.g., demographic data, such as registered address data, CDR data), in accordance in accordance with the defined location criteria and associated algorithms (e.g., defined location algorithm, adjustment algorithm), as more fully disclosed herein. The location designator component 410 can operate in conjunction with the adjuster component to facilitate determining or identifying potential base locations that can be associated with a user of a communication device, wherein the location designator component 410 or adjuster component 412 can determine the base location from the potential base locations based at least in part on additional data analysis, application of the applicable algorithm(s) (e.g., defined location algorithm and/or adjustment algorithm), and/or application of an applicable parameter(s) (e.g., a distance parameter relating to the distance between a first potential base location and a second potential base location. For example, the location designator component 410 or adjuster component 412 can determine that an initially determined base location (e.g., first potential base location) associated with a user of a communication device is to be adjusted to another base location (e.g., second potential base location) based at least in part on the activity data associated with the communication device, other data (e.g., demographic data, such as registered address data, CDR data), and an applicable distance parameter relating to the application or use of the information (e.g., activity data, demographic data) relating to the user and/or base location associated with the user, in accordance with the defined location criteria and associated algorithms (e.g., defined location algorithm, adjustment algorithm).

The calculator component 414 can perform calculations on or measurements of data. For instance, the calculator component 414 can calculate or measure the distance between a first potential base location and a second potential base location of a user of a communication device. The calculator component 414 also can calculate a ratio of a data value (e.g., number of users, demographic data value) relating to a subset of users who have a subset of user characteristics and who are associated with a service provider to another data value relating to a set (e.g., all or virtually all) of users who have the subset of user characteristics and who are associated with a set (e.g., all or virtually all) of service providers. The calculator component 414 also can calculate and apply an adjustment factor to data associated with the subset of users who have the subset of user characteristics and who are associated with the service provider to upscale such data to generate adjusted data that can be used with respect to the set of users who have the subset of user characteristics and who are associated with the set of service providers.

The weight component 416 can apply respective weightings to respective items of data (e.g., respective data values of respective items of data) associated with a user of a communication device, in accordance with the defined location criteria. For example, the weight component 416 can apply a first weighting factor to a first item of data of a first data type (e.g., activity data relating to a voice communication) to generate first weighted data, a second weighting factor to a second item of data of a second data type (e.g., activity data relating to a data session, for instance, relating to web browsing on the Internet) to generate second weighted data, and/or a third weighting factor to a third item of data of a third data type (e.g., activity data relating to communicating a message, such as an SMS or MMS message) to generate third weighted data. The location designator component 410 or another component of the location identifier component 400 can utilize the first weighted data, second weighted data, and/or third weighted data to facilitate determining a base location associated with the user of the communication device.

The data anonymizer component 418 can anonymize data, such as activity data and/or can adjust the granularity of defining the base location(s) associated with the user(s) of the communication device(s) to facilitate maintaining the privacy of users. For example, the data anonymizer component 418 can remove (e.g., and replace with anonymized or pseudo data), modify, or encrypt items of data associated with a particular user or group of users that may be used by an unauthorized entity to identify the particular user or group of users. As another example, the anonymizer component 418 can adjust the granularity of defining a base location associated with a user of a communication device (or a subset of users of communication devices) such that the defined area is an area associated with a postal code (e.g., zip code), or can adjust the granularity of defining the base location such that the defined area is a coverage area of the base station within which the user(s) resides or is at least determined or predicted to reside.

The location identifier component 400 can comprise a processor component 520 that can work in conjunction with the other components (e.g., operations manager component 408, location designator component 410, adjuster component 412, calculator component 414, weight component 416, data anonymizer component 418, data store 422) to facilitate performing the various functions of the location identifier component 400. The processor component 420 can employ one or more processors, microprocessors, or controllers that can process data, such as information relating to activity (e.g., communications) between communication devices and base stations, users, demographic data (e.g., registered address data obtained from a demographic data provider), CDR data, applications, the communication network, traffic flows, policies, defined location criteria, algorithms, protocols, interfaces, tools, and/or other information, to facilitate operation of the location identifier component 400, as more fully disclosed herein, and control data flow between the location identifier component 400 and other components (e.g., communication network, base stations, communication devices, data sources, applications, a cloud, etc.) associated with the location identifier component 400.

The location identifier component 400 also can include a data store 422 that can store data structures (e.g., user data, metadata), code structure(s) (e.g., modules, objects, hashes, classes, procedures) or instructions, information relating to activity (e.g., communications) between communication devices and base stations, users, demographic data (e.g., registered address data obtained from a demographic data provider), CDR data, applications, the communication network, traffic flows, policies, defined location criteria, algorithms, protocols, interfaces, tools, and/or other information, to facilitate controlling operations associated with the location identifier component 400. In an aspect, the processor component 420 can be functionally coupled (e.g., through a memory bus) to the data store 422 in order to store and retrieve information desired to operate and/or confer functionality, at least in part, to the operations manager component 408, location designator component 410, adjuster component 412, calculator component 414, weight component 416, data anonymizer component 418, etc., and/or substantially any other operational aspects of the location identifier component 400.

Figure 5:
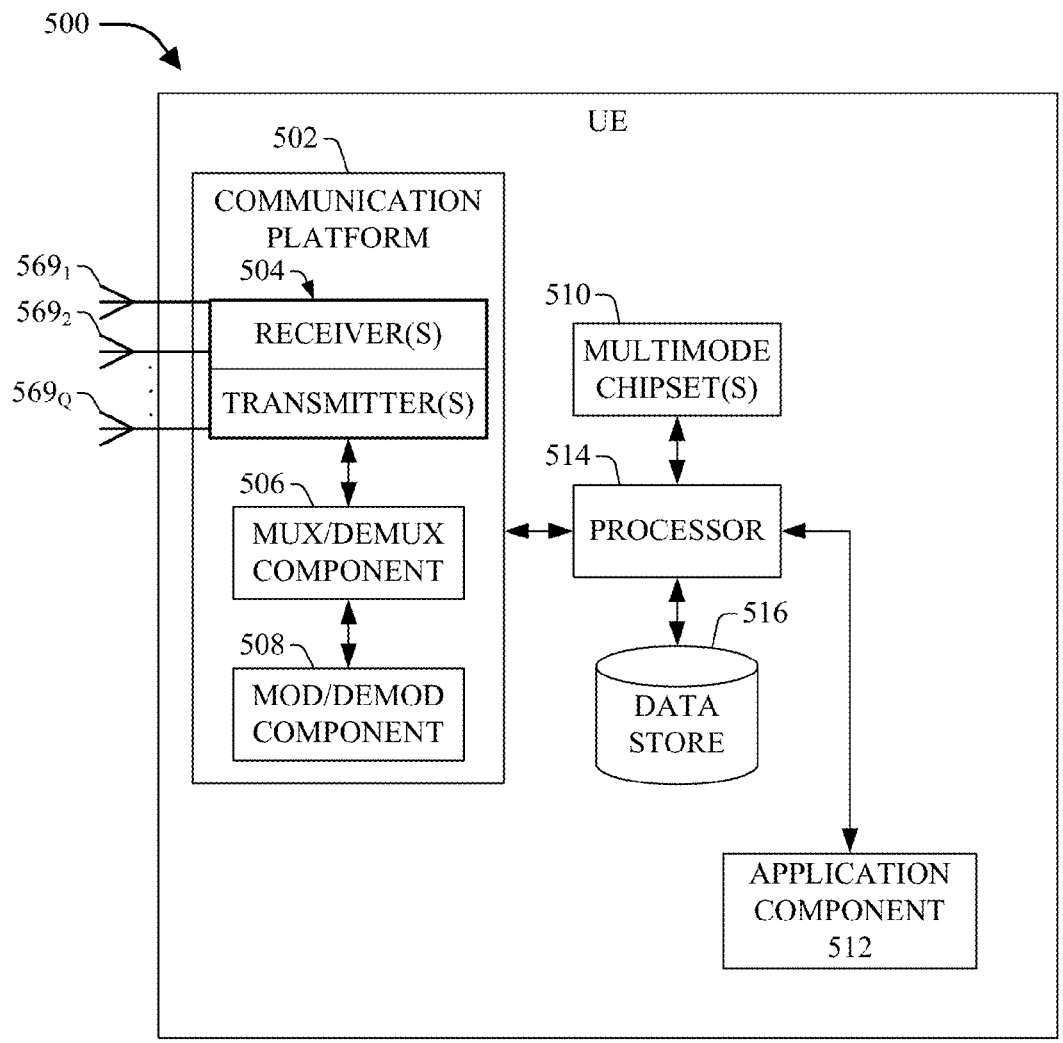
FIG. 5 depicts a block diagram of an example user equipment (UE) in accordance with an aspect of the disclosed subject matter.

FIG. 5 depicts a block diagram of an example UE 500 (e.g., communication device) in accordance with an aspect of the disclosed subject matter. In an aspect, the UE 600 can be a multimode access terminal, wherein a set of antennas $569_1$-$569_Q$ (Q is a positive integer) can receive and transmit signal(s) from and to wireless devices like access points, access terminals, wireless ports and routers, and so forth, which operate in a radio access network. It should be appreciated that antennas $569_1$-$569_Q$ can be part of the communication platform 502, which can comprise electronic components and associated circuitry that can provide for processing and manipulation of received signal(s) and signal(s) to be transmitted, e.g., by receivers and transmitters 504, multiplexer/demultiplexer (mux/demux) component 506, and modulation/demodulation (mod/demod) component 508.

In another aspect, the UE 500 can include a multimode operation chipset(s) 510 that can allow the UE 500 to operate in multiple communication modes in accordance with disparate technical specification for wireless technologies. In an aspect, multimode operation chipset(s) 510 can utilize communication platform 502 in accordance with a specific mode of operation (e.g., voice, GPS). In another aspect, multimode operation chipset(s) 510 can be scheduled to operate concurrently (e.g., when Q>1) in various modes or within a multitask paradigm.

In accordance with various implementations, the UE 500 can comprise an application component 512 that can comprise or be associated with one or more applications that can be utilized by the UE 500. The applications can comprise, for example, a voice or phone application for sending and receiving voice calls, a messaging application for sending and receiving messages (e.g., SMS, MMS), an email application for drafting, sending, and receiving email messages, a web browser application for accessing information on web sites, and/or a GPS and/or mapping application that can be employed to identify the location of the communication device, identify the location of a target destination, and identify a route between two locations (e.g., a current location, and a target destination location).

The UE 500 also can include a processor(s) 514 that can be configured to confer functionality, at least in part, to substantially any electronic component within the UE 500, in accordance with aspects of the disclosed subject matter. The processor(s) 514 can facilitate enabling the UE 500 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. The processor(s) 514 also can facilitate enabling the UE 500 to process data relating to messaging, voice calls, applications, services, wireless states, users, the communication network (e.g., network-related conditions, states, notifications, events, etc.), traffic flows (e.g., traffic flow-related conditions, states, notifications, events, etc.), authentication, etc.

The UE 500 also can contain a data store 516 that can store data structures (e.g., user data, metadata); code structures (e.g., modules, objects, classes, procedures) or instructions; message hashes; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, authentication, and/or other data; user policies; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; etc. In an aspect, the processor(s) 514 can be functionally coupled (e.g., through a memory bus) to the data store 516 in order to store and retrieve information (e.g., data structures; code structures; instructions; algorithms; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, authentication, etc.) desired to operate and/or confer functionality, at least in part, to the communication platform 502, multimode operation chipset(s) 510, application component 512, and/or substantially any other operational aspects of the UE 500.

Figure 6:
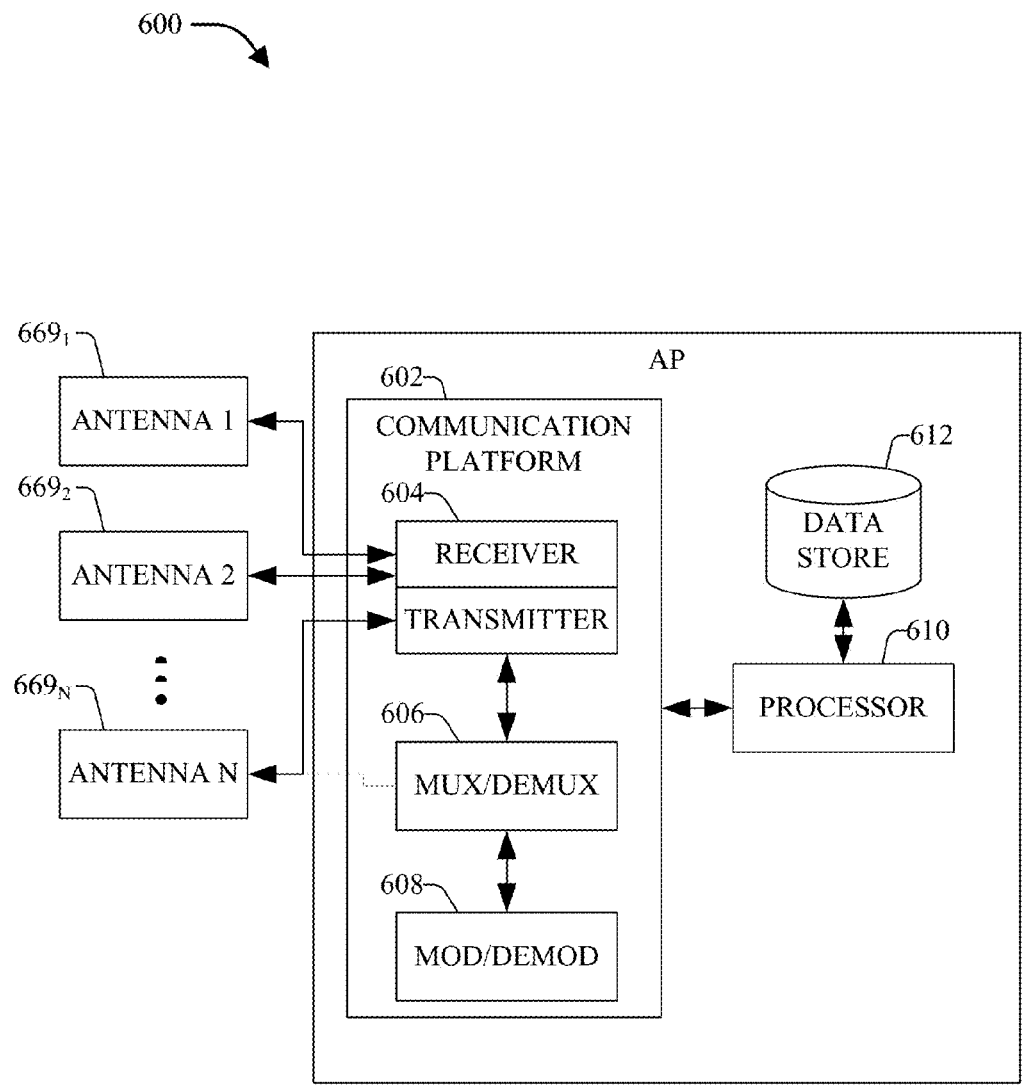
FIG. 6 illustrates a block diagram of an example access point in accordance with an aspect of the disclosed subject matter.

FIG. 6 illustrates a block diagram of an example AP 600 (e.g., macro base station, femtocell, or picocell) in accordance with an aspect of the disclosed subject matter. The AP 600 can receive and transmit signal(s) from and to wireless devices like access points (e.g., base stations, femtocells, or picocells), access terminals (e.g., UEs), wireless ports and routers, and the like, through a set of antennas $669_1$-$669_N$. In an aspect, the antennas $669_1$-$669_N$ can be a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of the communication platform 602, and can modulate information according to multiple modulation techniques, such as frequency modulation, amplitude modulation (e.g., M-ary quadrature amplitude modulation (QAM), with M a positive integer), phase-shift keying (PSK), and the like.

The AP 600 also can comprise a processor(s) 610 that can be configured to confer and/or facilitate providing functionality, at least partially, to substantially any electronic component in or associated with the AP 600. For instance, the processor(s) 610 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc., to facilitate between an associated UE and the communication network.

In another aspect, the AP 600 can include a data store 612 that can store data structures; code instructions; rate coding information; information relating to measurement of radio link quality or reception of information related thereto; information relating to establishing a communications connection between a communication device (e.g., UE) and other communication devices; system or device information like policies and specifications; code sequences for scrambling; spreading and pilot transmission; floor plan configuration; access point deployment and frequency plans; scheduling policies; and so on. The processor(s) 610 can be coupled to the data store 612 in order to store and retrieve information (e.g., information relating to multiplexing/demultiplexing or modulation/demodulation, information relating to radio link levels, information relating to establishing communication connections associated with a UE(s) served by the AP 600, etc.) desired to operate and/or confer functionality to the communication platform 602, and/or other operational components of AP 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 7-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
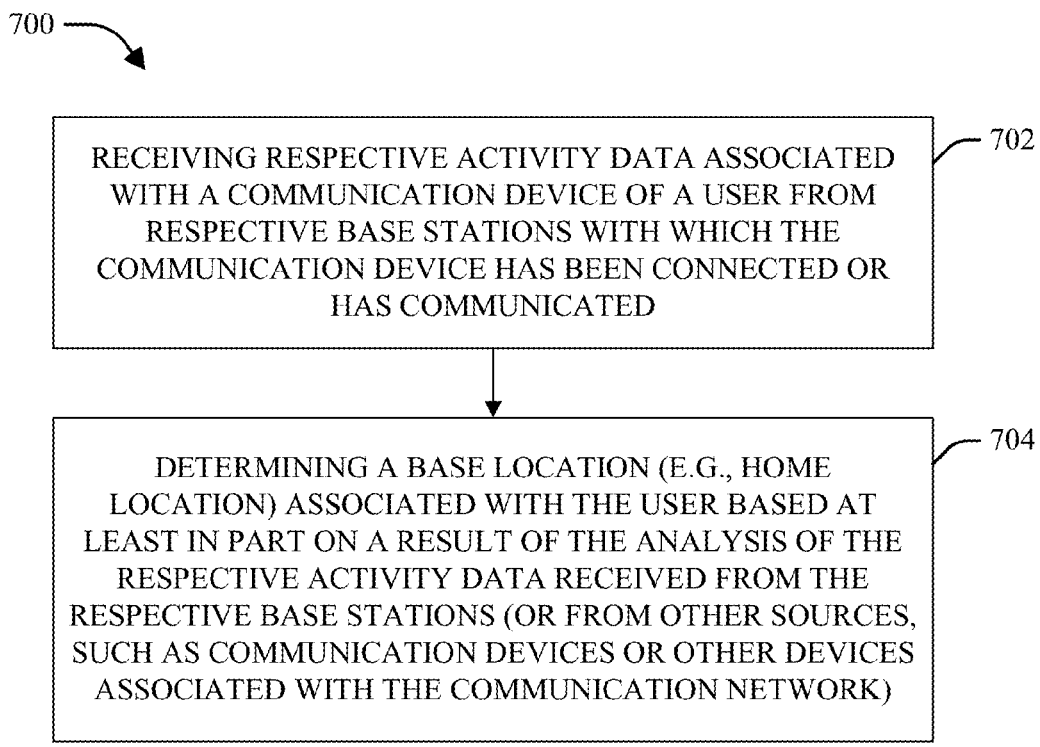
FIG. 7 illustrates a flow diagram of an example method that can facilitate determining a base location (e.g., home location) of a user associated with a communication device, in accordance with various aspects and embodiments of the disclosed subject matter.

FIG. 7 illustrates a flow chart of an example method 700 that can facilitate determining a base location (e.g., home location) of a user associated with a communication device, in accordance with various aspects and embodiments of the disclosed subject matter. The method 700 can be employed by, for example, a location identifier component in or associated with a communication network.

At 702, respective activity data associated with a communication device of a user can be received from respective base stations with which the communication device has been connected or has communicated. The location identifier component can receive (e.g., obtain) the respective activity data associated with the communication device of the user from or in connection with the respective base stations (e.g., base station devices) with which the communication device has been connected or has communicated, or from the communication network associated with the respective base stations. For instance, the location identifier component can monitor and detect activity (e.g., voice calls, Internet activity, messaging, signal strength, location-related or pinging signals, other activity) of communication devices of users with base stations in the communication network, and can receive (e.g., obtain, collect) information (e.g., activity data) regarding such activity from the base stations, communication devices, or other devices associated with the communication network.

At 704, a base location (e.g., home location) associated with the user can be determined based at least in part on a result of the analysis of the respective activity data received from the respective base stations (or from other sources, such as communication devices, or other devices associated with the communication network). The location identifier component can analyze the respective activity data, and can determine the base location associated with the user based at least in part on the result of the analysis of the respective activity data (and/or other data (e.g., demographic data, such as registered address data obtained from a demographic data provider), CDR data)).

Figure 8:
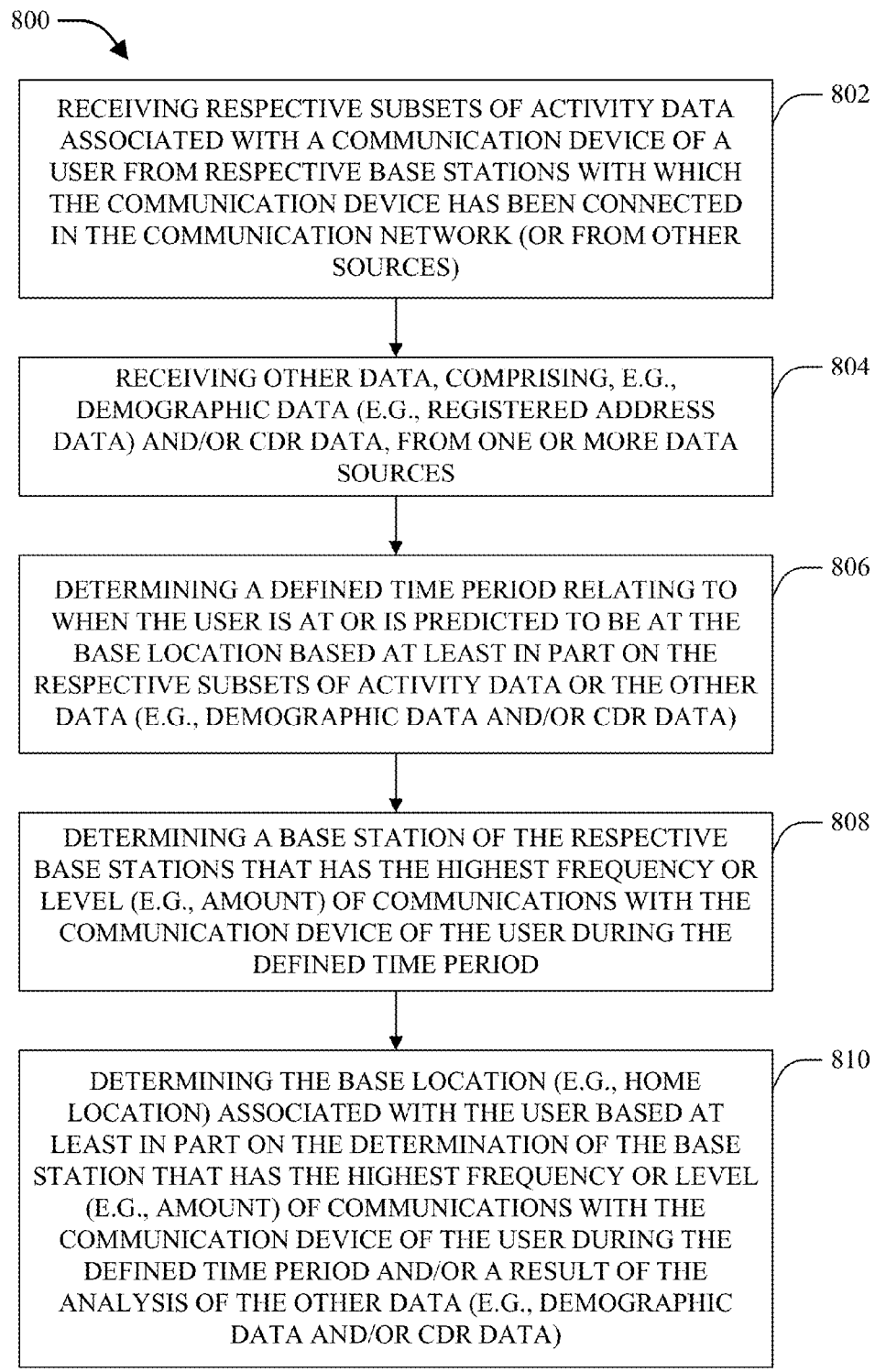
FIG. 8 presents a flow chart of another example method that can facilitate determining a base location (e.g., home location) of a user associated with a communication device, in accordance with various aspects and embodiments of the disclosed subject matter.

FIG. 8 presents a flow chart of another example method 800 that can facilitate determining a base location (e.g., home location) of a user associated with a communication device, in accordance with various aspects and embodiments of the disclosed subject matter. In accordance with various aspects, the method 800 can be employed by, for example, a location identifier component in or associated with a communication network.

At 802, respective subsets of activity data associated with a communication device of a user can be received from respective base stations with which the communication device has been connected in the communication network. The location identifier component can receive respective subsets of activity data associated with the communication device of the user from respective base stations (e.g., base station devices) with which the communication device has been connected in the communication network and/or can receive activity data from other sources (e.g., the communication device of the user, other devices of the communication network).

At 804, other data, comprising, for example, demographic data (e.g., registered address data) and/or CDR data, can be received from one or more data sources. The location identifier component can receive such other data from one or more data sources (e.g., demographic data provider, service provider).

At 806, a defined time period relating to when the user is at or is predicted to be at the base location can be determined based at least in part on the respective subsets of activity data or the other data (e.g., demographic data and/or CDR data). The location identifier component can determine the defined time period, which relates to when the user is at or is predicted to be at the base location, based at least in part on the respective subsets of activity data or the other data. In some implementations, the location identifier component can determine and assign an initial or default defined time period that relates to when the user is at or is predicted to be at the base location, wherein the initial or default defined time period (or the defined time period) can be adjust or refined based at least in part on subsequent information (e.g., subsequent activity data associated with the communication device, subsequent demographic and/or CDR data) received and analyzed by the location identifier component.

At 808, a base station of the respective base stations that has the highest frequency or level (e.g., amount) of communications with the communication device of the user during the defined time period can be determined. The location identifier component can analyze the activity data associated with the communication device. Based at least in part on the results of the analysis of the activity data, the location identifier component can determine which base station of the respective base stations has the highest frequency or level (e.g., amount) of communications (e.g., voice, data, messaging, signaling, pinging) with the communication device of the user during the defined time period. In some implementations, the respective types of communications (e.g., voice, data, messaging, signaling, pinging) can be respectively (e.g., differently) weighted (e.g., the respective communications having respective communication characteristics can be respectively weighted based at least in on the respective communication characteristics) to facilitate more accurately determining the base location associated with the user, and accordingly, the highest frequency, level, or amount of communications can be the highest weighted frequency, level, or amount of communications associated with the communication device of the user.

At 810, the base location (e.g., home location) associated with the user can be determined based at least in part on the determination of the base station that has the highest frequency or level (e.g., amount) of communications with the communication device of the user during the defined time period and/or a result of the analysis of the other data (e.g., demographic data and/or CDR data). For instance, the location identifier component can determine that a defined area (e.g., area associated with a zip code, coverage area of the base station) associated with the base station that has the highest frequency or level (e.g., amount) of communications with the communication device of the user, relative to other respective frequencies or levels of communications of other base stations with the communication device of the user, during the defined time period is the base location associated with the user, in accordance with certain defined location criteria (e.g., when the certain defined location criteria is applied by the location identifier component).

As another example, the location identifier component can determine that another defined area (e.g., area associated with another zip code or coverage area of another base station that is within a defined distance of the base station) is the base location associated with the user, based at least in part on the base station having the highest frequency or level (e.g., amount) of communications with the communication device of the user during the defined time period and the results of the analysis of the other data indicating that the base location is at another location that is within a defined distance of the base station, in accordance with other defined location criteria (e.g., when the other defined location criteria is applied by the location identifier component). The other defined location criteria to be applied can be determined by the location identifier component based at least in part on the particular application for which the base location of the user is to be used, wherein the application can relate to a concert or show, a sporting event, a sales event, or another event.

Figure 9:
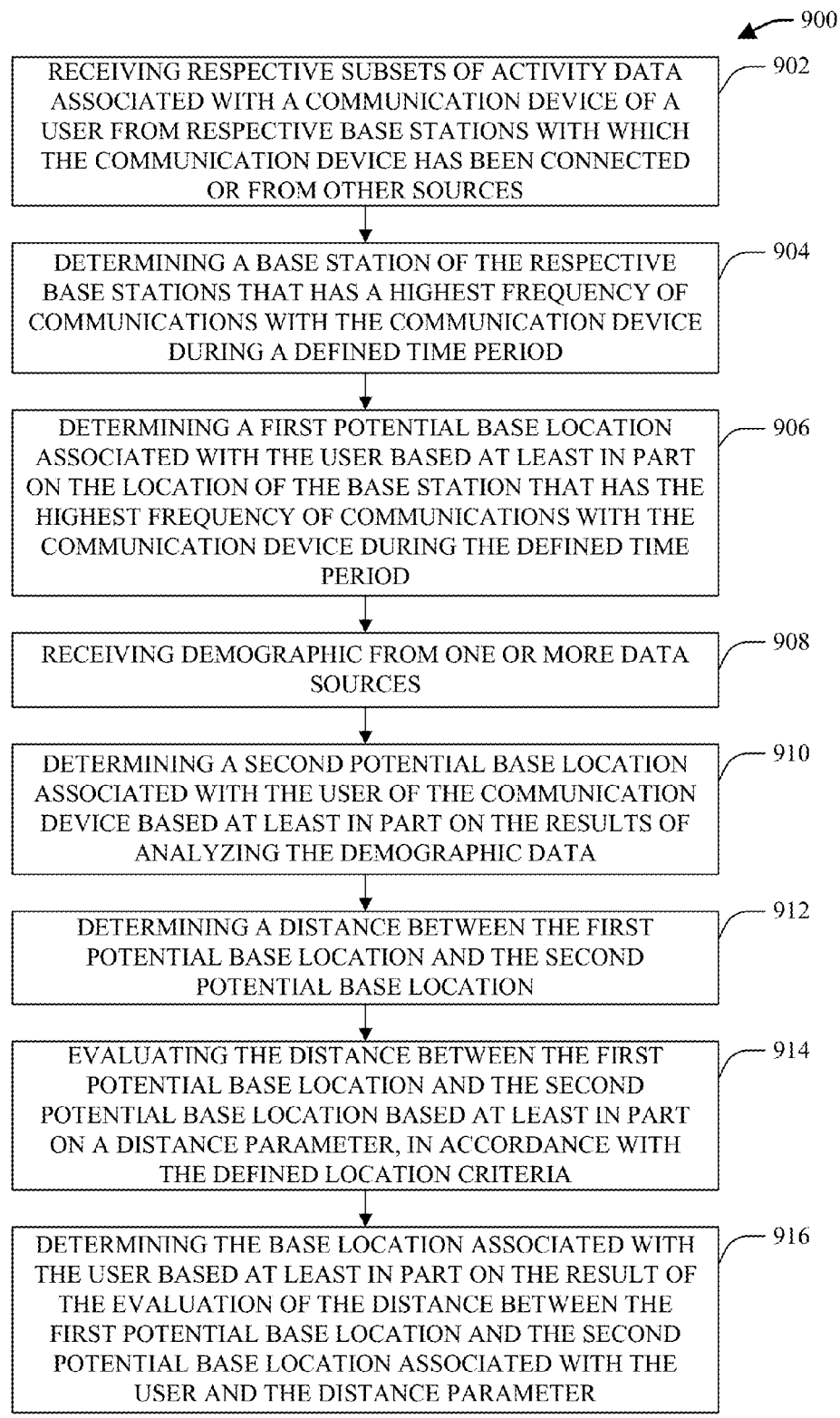
FIG. 9 depicts a flow diagram of an example method that can facilitate determining a base location (e.g., home location) of a user associated with a communication device using activity data associated with a communication device of a user and demographic data, in accordance with various aspects and embodiments described herein.

In some implementations, the method 900 associated with FIG. 9 can be employed to facilitate determining the base location associated with the user, as more fully described herein.

Referring next to FIG. 9, depicted is a flow chart of an example method 900 that can facilitate determining a base location (e.g., home location) of a user associated with a communication device using activity data associated with a communication device of a user and demographic data (e.g., registered address data), in accordance with various aspects and embodiments described herein. The method 900 can be employed by, for example, a location identifier component in or associated with a communication network.

At 902, respective subsets of activity data associated with a communication device of a user can be received from respective base stations with which the communication device has been connected in the communication network or from other sources. The location identifier component can receive the respective subsets of activity data associated with the communication device of the user from respective base stations with which the communication device has been connected in the communication network and/or can receive activity data from other sources (e.g., the communication device of the user, other devices of the communication network).

At 904, a base station of the respective base stations that has the highest frequency or level (e.g., amount) of communications with the communication device of the user during a defined time period can be determined. The location identifier component can analyze the activity data associated with the communication device. Based at least in part on the results of the analysis of the activity data, the location identifier component can determine which base station of the respective base stations has the highest frequency or level (e.g., amount) of communications (e.g., voice, data, messaging, signaling, pinging) with the communication device of the user, relative to other respective frequencies or levels of communications of other base stations with the communication device of the user, during the defined time period. In some implementations, the respective types of communications (e.g., voice, data, messaging, signaling, pinging) can be respectively (e.g., differently) weighted to facilitate more accurately determining the base location associated with the user, and accordingly, the highest frequency, level, or amount of communications can be the highest weighted frequency, level, or amount of communications associated with the communication device of the user.

At 906, a first potential base location associated with the user of the communication device can be determined based at least in part on the location of the base station that has the highest frequency or level (e.g., amount) of communications with the communication device of the user during the defined time period. The location identifier component can determine or identify the first potential base location associated with the user of the communication device based at least in part on the location of the base station that has the highest frequency or level (e.g., amount) of communications with the communication device of the user during the defined time period.

At 908, demographic data, comprising data (e.g., registered address data) regarding a second potential base location associated with the user of the communication device, can be received from one or more data sources. The location identifier component can receive such demographic data from one or more data sources (e.g., demographic data provider, service provider).

At 910, a second potential base location associated with the user of the communication device can be determined based at least in part on the results of analyzing the demographic data. The location identifier component can analyze the demographic data. The location identifier component can determine or identify the second potential base location associated with the user of the communication device based at least in part on the results of analyzing the demographic data.

At 912, a distance between the first potential base location and the second potential base location associated with the user can be determined. The location identifier component can determine (e.g., calculate) the distance (e.g., geographical distance) between the first potential base location and the second potential base location associated with the user.

At 914, the distance between the first potential base location and the second potential base location associated with the user can be evaluated based at least in part on a distance parameter relating to an application or use of the information relating to the user or the base location associated with the user, in accordance with the defined location criteria. The location identifier component can evaluate the distance between the first potential base location and the second potential base location associated with the user based at least in part on a distance parameter relating to an application or use of the information relating to the user or the base location associated with the user, in accordance with the defined location criteria.

At 916, the base location associated with the user can be determined based at least in part on the result of the evaluation of the distance between the first potential base location and the second potential base location associated with the user and the distance parameter relating to the application or use of the information relating to the base location of the user. The location identifier component can determine or select the base location associated with the user based at least in part on the evaluation result and the distance parameter relating to the application or use of the information relating to the base location of the user, in accordance with the defined location criteria.

For example, in accordance with the defined location criteria (e.g., when the applicable defined location criteria relating to the application or use of the information relating to the base location of the user is applied), the location identifier component can determine that the first potential base location is to be selected as the base location when the second potential base location is greater than a defined distance (e.g., 1 mile, 2 miles, 3 miles, . . . , 5 miles, . . . , 10 miles, . . . 20 miles, . . . ) away from the first potential base location, or can determine that the second potential base location is to be selected as the base location when the second potential base location is less than or equal to the defined distance away from the first potential base location. That is, the first potential base station, which was determined (e.g., calculated) based at least in part on determining the location of the base station that has the highest frequency or level (e.g., amount) of communications with the communication device of the user during the defined time period, at least initially can be the base location associated with the user. However, in accordance with the applicable defined location criteria for the application or use of such information, the location identifier component can adjust (e.g., move, modify) the base location associated with the user from the first potential base location to the second potential base location, which was determined based at least in part on the demographic data. There can be different defined distances for adjusting a base location from the first potential base location to the second potential based location based at least in part on different applications or uses for the information relating to the base location associated with a user.

In some implementations, the base location associated with the user of the communication device can be determined (e.g., by the location identifier component) between the first potential base location and the second potential base location associated with the user based at least in part on a first frequency or level (e.g., amount) of communications of a first base station (e.g., base station having highest frequency or level of communications) with the communication device of the user during the defined time period, a second frequency or level (e.g., amount) of communications of a second base station with the communication device of the user during the defined time period, the distance between the first potential base location and the second potential base location, an applicable distance parameter, and the results of analyzing the demographic data. For example, if the second frequency or level of communications of the second base location with the communication device of the user is second highest relative to the first frequency or level of communications of the first base station with the communication device, and the second potential base location, which is associated with the second base station, is identified based at least in part on the demographic data, the applicable distance parameter (e.g., for a particular application or use) can be (e.g., can be adjusted to) a different distance parameter value (e.g., a larger distance parameter value) than the distance parameter value employed if the second frequency or level of communications had been lower than the second highest frequency or level of communications, in accordance with the defined location criteria.

Figure 10:
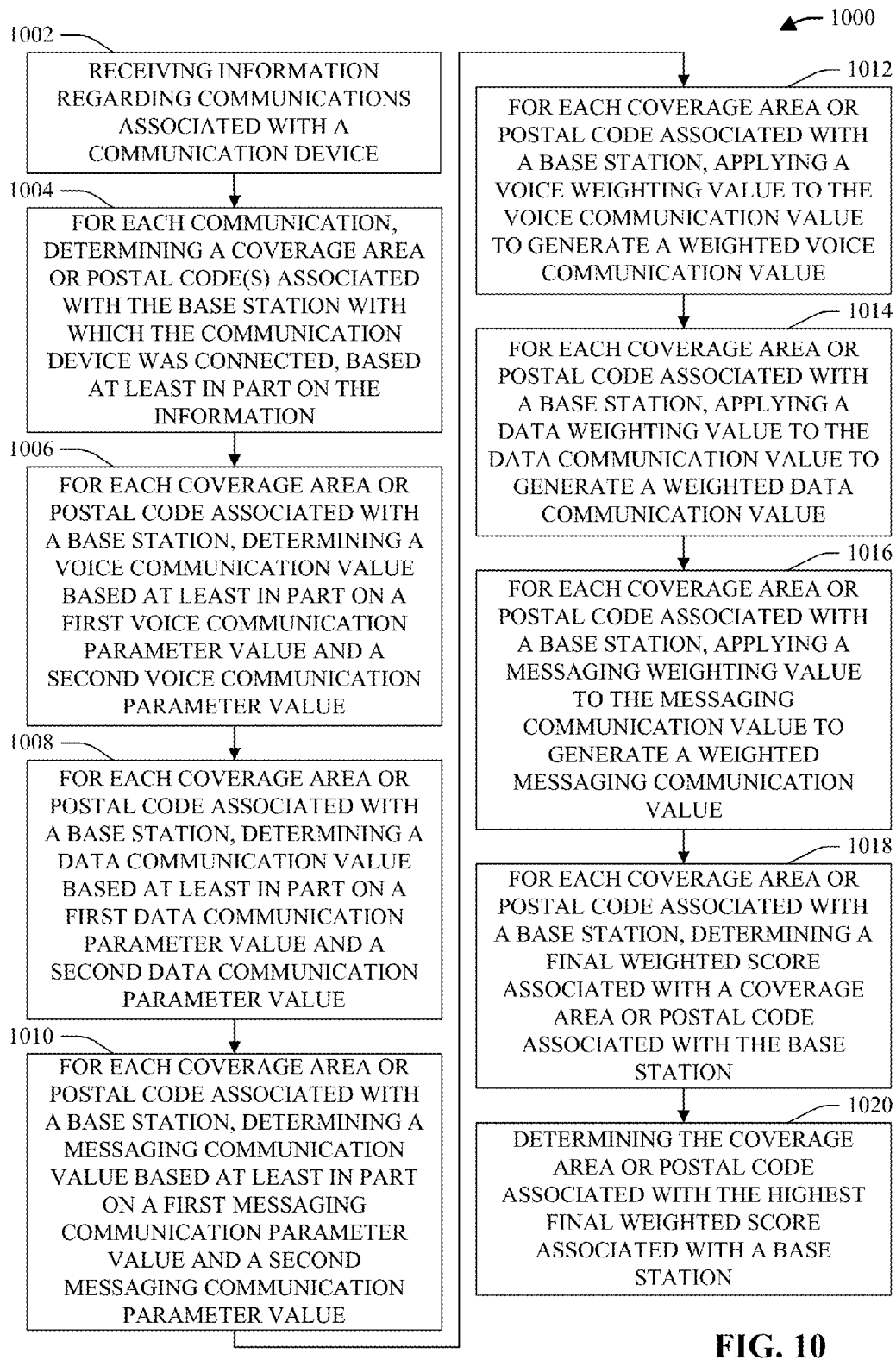
FIG. 10 depicts a flow chart of an example method that can respectively weight communications associated with a communication device of a user to facilitate determining a base location (e.g., home location) of the user associated with the communication device, in accordance with various aspects and embodiments of the disclosed subject matter.

Referring to FIG. 10, depicted is a flow chart of an example method 1000 that can respectively weight communications associated with a communication device of a user to facilitate determining a base location (e.g., home location) of the user associated with the communication device, in accordance with various aspects and embodiments of the disclosed subject matter. In accordance with various aspects, the method 1000 can be employed by, for example, a location identifier component in or associated with a communication network.

At 1002, information (e.g., activity data) regarding voice communications, data communications, and messaging communications associated with a communication device for defined time-of-day periods during a defined overall time period can be received. The location identifier component can receive the information regarding the voice communications, data communications, and messaging communications associated with the communication device for the defined time-of-day periods during the defined overall time period from, for example, CDRs, comprising data regarding base stations with which the communication device has been connected with respect to the various communications, and/or the base stations. With regard to a particular communication, the information can comprise, for example, data that can identify or at least facilitate identifying the base station with which the communication device was connected, location of the base station, type of communication (e.g., voice call, data communication, SMS or MMS message), time of the communication, length of the voice call (e.g., call duration), length of the data communication (e.g., length of the data session), and/or a postal code(s) (e.g., zip code) associated with the base station.

The defined time-of-day periods can be periods of time (e.g., 10 p.m. to 6 a.m.) of the day that has been determined (e.g., by the location identifier component, or by another component or entity) to be a time when the user can be expected (e.g., predicted) to be at a base location (e.g., home) of the user. The defined overall time period can be the desired overall amount of time (e.g., 1 week, 2 weeks, or other desired length of time) of the sampling of communications associated with the communication device.

At 1004, for each communication associated with the communication device of a user, a coverage area or postal code(s) associated with the base station with which the communication device was connected can be determined, based at least in part on the information (e.g., data from CDRs) regarding the voice communications, data communications, and messaging communications associated with the communication device. With regard to each communication associated with the communication device over the defined time period, the location identifier component can determine or identify a coverage area or postal code(s) associated with the base station with which the communication device was connected, based at least in part on the information (e.g., data from CDRs) regarding the voice communications, data communications, and messaging communications associated with the communication device.

At 1006, with regard to each of the respective coverage areas or postal codes associated with the respective base stations, a respective voice communication value can be determined based at least in part on a respective first voice communication parameter value associated with a coverage area or postal code associated with a respective base station with which the communication device has had voice communications, and a second voice communication parameter value associated with all voice communications with the respective base stations by the communication device, during the defined time-of-day periods during the defined overall time period. The location identifier component can determine the respective first voice communication parameter values associated with the respective base stations and the second voice communication parameter value based at least in part on the portion of the information relating to voice communications. With regard to each of the respective coverage areas or postal codes associated with the respective base stations, the location identifier component can determine the respective voice communication value based at least in part on the respective first voice communication parameter value (e.g., relating to length of time of voice communications or number of voice communications) associated with the coverage area or postal code associated with the respective base station with which the communication device has had voice communications, and can determine the second voice communication parameter value (e.g., relating to length of time of voice communications or number of voice communications) associated with all voice communications with the respective base stations by the communication device, during the defined time-of-day periods during the defined overall time period.

At 1008, with regard to each of the respective coverage areas or postal codes associated with the respective base stations, a respective data communication value can be determined based at least in part on a respective first data communication parameter value associated with a coverage area or postal code associated with a respective base station with which the communication device has had data communications, and a second data communication parameter value associated with all data communications with the respective base stations by the communication device, during the defined time-of-day periods during the defined overall time period. The location identifier component can determine the respective first data communication parameter values and the second data communication parameter value based at least in part on the portion of the information relating to data communications. With regard to each of the respective coverage areas or postal codes associated with the respective base stations, the location identifier component can determine the respective data communication value based at least in part on the respective first data communication parameter value (e.g., relating to length of time of data communications or number of data communications) associated with the coverage area or postal code associated with the respective base station with which the communication device has had data communications, and the second data communication parameter value (e.g., relating to length of time of data communications or number of data communications) associated with all data communications with the respective base stations by the communication device, during the defined time-of-day periods during the defined overall time period.

At 1010, with regard to each of the respective coverage areas or postal codes associated with the respective base stations, a respective messaging communication value can be determined based at least in part on a respective first messaging communication parameter value associated with a coverage area or postal code associated with a respective base station with which the communication device has had messaging communications, and a second messaging communication parameter value associated with all messaging communications with the respective base stations by the communication device, during the defined time-of-day periods during the defined overall time period. The location identifier component can determine the respective first messaging communication parameter values and the second messaging communication parameter value based at least in part on the portion of the information relating to messaging communications. With regard to each of the respective coverage areas or postal codes associated with the respective base stations, the location identifier component can determine the respective messaging communication value based at least in part on the respective first messaging communication parameter value (e.g., relating to the number of messaging communications) associated with the coverage area or postal code associated with the respective base station with which the communication device has had messaging communications, and the second messaging communication parameter value (e.g., relating to the number of data communications) associated with all messaging communications with the respective base stations by the communication device, during the defined time-of-day periods during the defined overall time period.

At 1012, with regard to each of the respective coverage areas or postal codes associated with the respective base stations, a respective voice weighting value can be applied to the respective voice communication value, which can be associated with the respective base station with which the communication device has had voice communications, to generate a respective weighted voice communication value, based at least in part on a respective frequency value relating to a number of the defined time-of-day periods during the defined overall time period that the communication device had a voice communication with the respective base station. With regard to each of the respective coverage areas or postal codes associated with the respective base stations, the location identifier component can determine the respective voice weighting value based at least in part on the respective frequency value relating to the number of the defined time-of-day periods during the defined overall time period that the communication device had a voice communication with the respective base station. Also, with regard to each of the respective coverage areas or postal codes associated with the respective base stations, the location identifier component can apply the respective voice weighting value to the respective voice communication value, which can be associated with the respective base station with which the communication device has had voice communications, to generate the respective weighted voice communication value.

At 1014, with regard to each of the respective coverage areas or postal codes associated with the respective base stations, a respective data weighting value can be applied to the respective data communication value, which can be associated with the respective base station with which the communication device has had data communications, to generate a respective weighted data communication value, based at least in part on a respective frequency value relating to a number of the defined time-of-day periods during the defined overall time period that the communication device had a data communication with the respective base station. With regard to each of the respective coverage areas or postal codes associated with the respective base stations, the location identifier component can determine the respective data weighting value based at least in part on the respective frequency value relating to the number of the defined time-of-day periods during the defined overall time period that the communication device had a data communication with the respective base station. Also, with regard to each of the respective coverage areas or postal codes associated with the respective base stations, the location identifier component can apply the respective data weighting value to the respective data communication value, which can be associated with the respective base station with which the communication device has had data communications, to generate the respective weighted data communication value.

At 1016, with regard to each of the respective coverage areas or postal codes associated with the respective base stations, a respective messaging weighting value can be applied to the respective messaging communication value, which can be associated with the respective base station with which the communication device has had messaging communications, to generate a respective weighted messaging communication value, based at least in part on a respective frequency value relating to a number of the defined time-of-day periods during the defined overall time period that the communication device had a messaging communication with the respective base station. With regard to each of the respective coverage areas or postal codes associated with the respective base stations, the location identifier component can determine the respective messaging weighting value based at least in part on the respective frequency value relating to the number of the defined time-of-day periods during the defined overall time period that the communication device had a messaging communication with the respective base station. Also, with regard to each of the respective coverage areas or postal codes associated with the respective base stations, the location identifier component can apply the respective messaging weighting value to the respective messaging communication value, which can be associated with the respective base station with which the communication device has had messaging communications, to generate the respective weighted messaging communication value.

At 1018, with regard to each of the respective coverage areas or postal codes associated with the respective base stations, a respective final weighted score associated with a respective coverage areas or postal code associated with the respective base station can be determined based at least in part on the respective weighted voice communication value, the respective weighted data communication value, and the respective weighted messaging communication value associated with the respective base station. With regard to each of the respective coverage areas or postal codes associated with the respective base stations, the location identifier component can determine (e.g., calculate) a respective final weighted score associated with a respective coverage area or postal code associated with a respective base station based at least in part on the respective weighted voice communication value, the weighted respective data communication value, and the respective weighted messaging communication value associated with the respective base station.

At 1020, the coverage area or postal code associated with the highest final weighted score associated with a respective base station can be determined based at least in part on the results of analyzing the respective final weighted scores associated with the respective base stations. The location identifier component can determine or identify the coverage area or postal code associated with the highest final weighted score that is associated with a respective base station based at least in part on the results of analyzing the respective final weighted scores associated with the respective base stations. The location identifier component can determine that the coverage area or postal code associated with the highest final weighted score is the base location associated with the user of the communication device or at least is a potential base location associated with the user of the communication device (e.g., subject to further analysis based at least in part on registered address information associated with the user or the communication device, as more fully disclosed and described herein).

Figure 11:
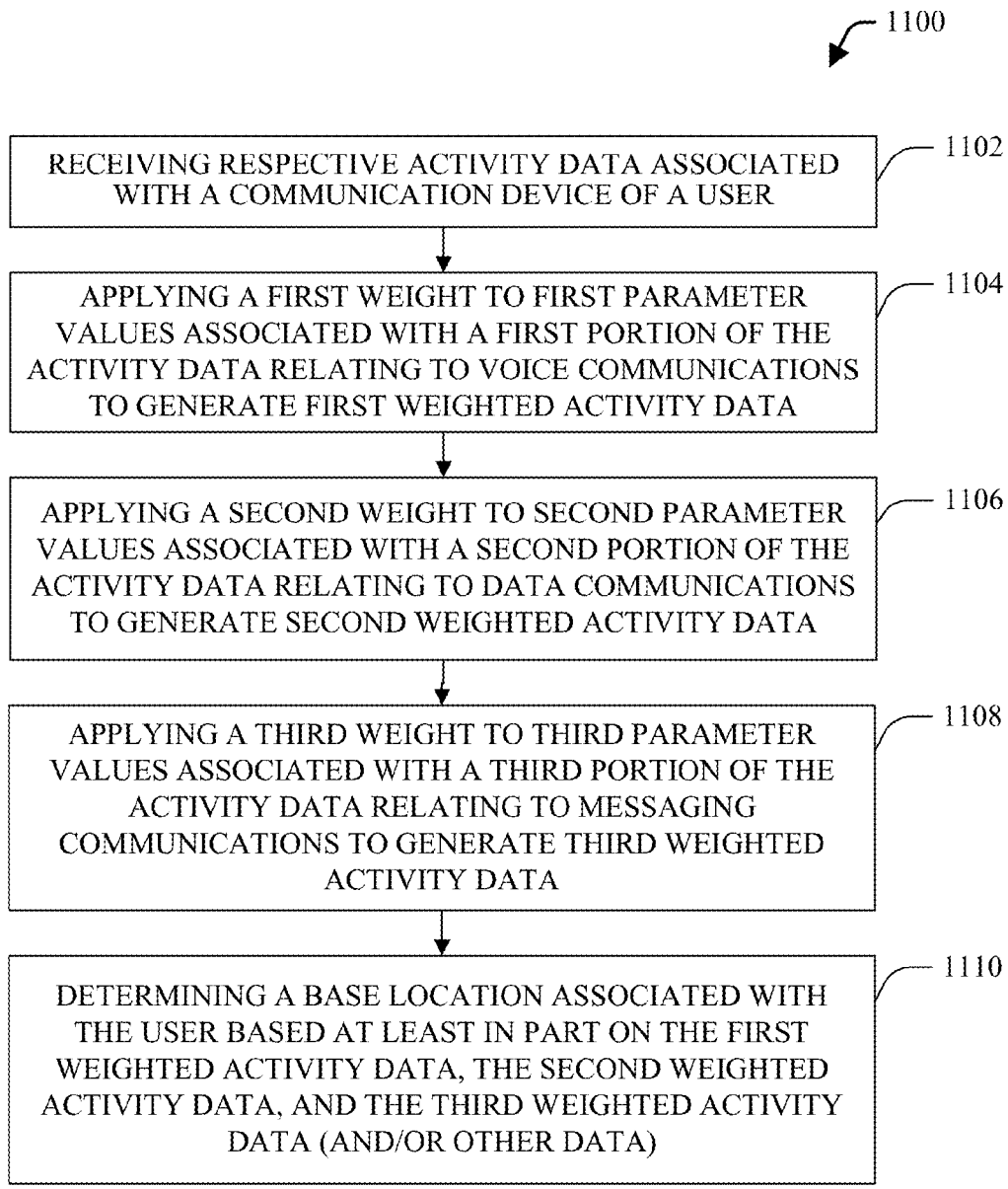
FIG. 11 illustrates a flow chart of another example method that can respectively weight communications associated with a communication device of a user to facilitate determining a base location (e.g., home location) of the user associated with the communication device, in accordance with various aspects and embodiments of the disclosed subject matter.

Turning to FIG. 11, depicted is a flow chart of another example method 1100 that can respectively weight communications associated with a communication device of a user to facilitate determining a base location (e.g., home location) of the user associated with the communication device, in accordance with various aspects and embodiments of the disclosed subject matter. In accordance with various aspects, the method 1100 can be employed by, for example, a location identifier component in or associated with a communication network.

At 1102, respective activity data associated with a communication device of a user can be received from respective base stations with which the communication device has been connected or from other sources. The location identifier component can receive (e.g., obtain, collect) activity data relating to communications (e.g., communication events) associated with the communication device of the user from the respective base stations or from another data source(s) (e.g., another device(s) associated with the communication network).

At 1104, a first weight can be applied to first parameter values associated with a first portion of the activity data relating to voice communications associated with the communication device to generate first weighted activity data. The location identifier component can apply the first weight to the first parameter values associated with the first portion of the activity data to generate the first weighted activity data.

At 1106, a second weight can be applied to second parameter values associated with a second portion of the activity data relating to data communications associated with the communication device to generate second weighted activity data. The location identifier component can apply the second weight to the second parameter values associated with the second portion of the activity data to generate the second weighted activity data.

At 1108, a third weight can be applied to third parameter values associated with a third portion of the activity data relating to messaging (e.g., SMS, MMS) communications associated with the communication device to generate third weighted activity data. The location identifier component can apply the third weight to the third parameter values associated with the third portion of the activity data to generate the third weighted activity data.

At 1110, a base location (e.g., home location) associated with the user can be determined based at least in part on the first weighted activity data, the second weighted activity data, and the third weighted activity data (and/or other data (e.g., demographic data, CDR data)), associated with the communication device of the user. For instance, the location identifier component can determine the base location associated with the user based at least in part on the first weighted activity data, the second weighted activity data, and the third weighted activity data (and/or based at least in part on the other data), associated with the communication device of the user.

For example, the location identifier component can determine the base location associated with the user as the base location associated with (e.g., located within) a defined area associated with a base station that has the highest frequency or level (e.g., highest weighted frequency or level) of communications with the communication device of the user during the defined time period, relative to the other base stations, based at least in part on the first weighted activity data, the second weighted activity data, and the third weighted activity data, in accordance with the defined location criteria. As another example, the location identifier component can determine the base location associated with the user as the base location associated with (e.g., located within) another defined area (e.g., another zip code, another coverage area associated with another base station) within a defined distance of the base station, based at least in part on the first weighted activity data, the second weighted activity data, and the third weighted activity data, and based at least in part on the results of the analysis of the other data indicating that the base location is at the other defined area, which is within the defined distance of the base station, in accordance with the defined location criteria.

In some implementations, the location identifier component or another component can determine the respective (e.g., different or distinct) weighting of the first portion of the activity data relating to voice communications associated with the communication device, the second portion of the activity data relating to data communications associated with the communication device, and the third portion of the activity data relating to messaging (e.g., SMS, MMS) communications associated with the communication device based at least in part on demographic data, empirical data, or other data that can indicate which types of communication are more likely associated with (e.g., more likely to occur at) a base location (e.g., a home location), in accordance with the defined location criteria. For example, in accordance with the defined location criteria, the analysis of the demographic data, empirical data, or other data by the location identifier component or another component may indicate that voice communications of the user are more likely to occur at a base location of the user than data communications or messaging communications. Accordingly, the location identifier component or other component can weight voice communications associated with the communication device of the user higher than the weighting of data communications or messaging communications. It is to be appreciated and understood that the defined location criteria, the demographic data, the empirical data, or the other data can indicate alternate weightings of the respective communications (e.g., can alternatively indicate that data communications or messaging communications are to be weighted more heavily than voice communications of the user).

It also is to be appreciated and understood that the respective weighting of respective communications associated with a communication device of a user can be more highly granularized, as can be specified by the defined location criteria. For example, with regard to voice communications associated with the communication device of the user, a first subset of voice communications that have a first defined length of time greater than a defined threshold length of time can be weighted differently than the weighting of a second subset of voice communications that have a second defined length of time that is at or below the defined threshold length of time, when such weighting is specified by the defined location criteria. Such respective weighting can take into account that voice calls of a certain length can indicate that such calls are more likely to occur at the base location (e.g., home location) of the user, while other voice calls of a different length can indicate that such other voice calls are less likely to occur at the base location.

Figure 12:
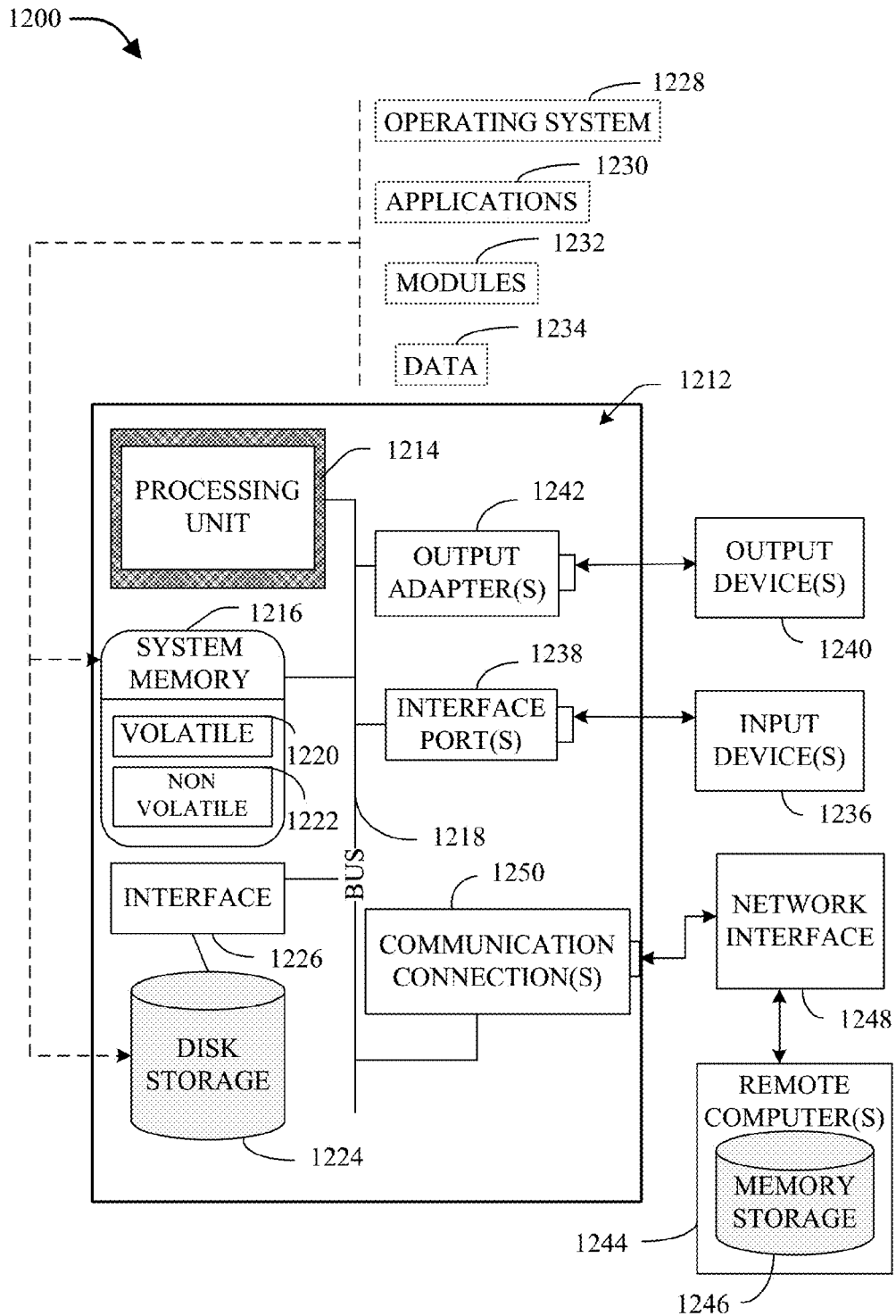
FIG. 12 is a schematic block diagram illustrating a suitable operating environment.
Figure 13:
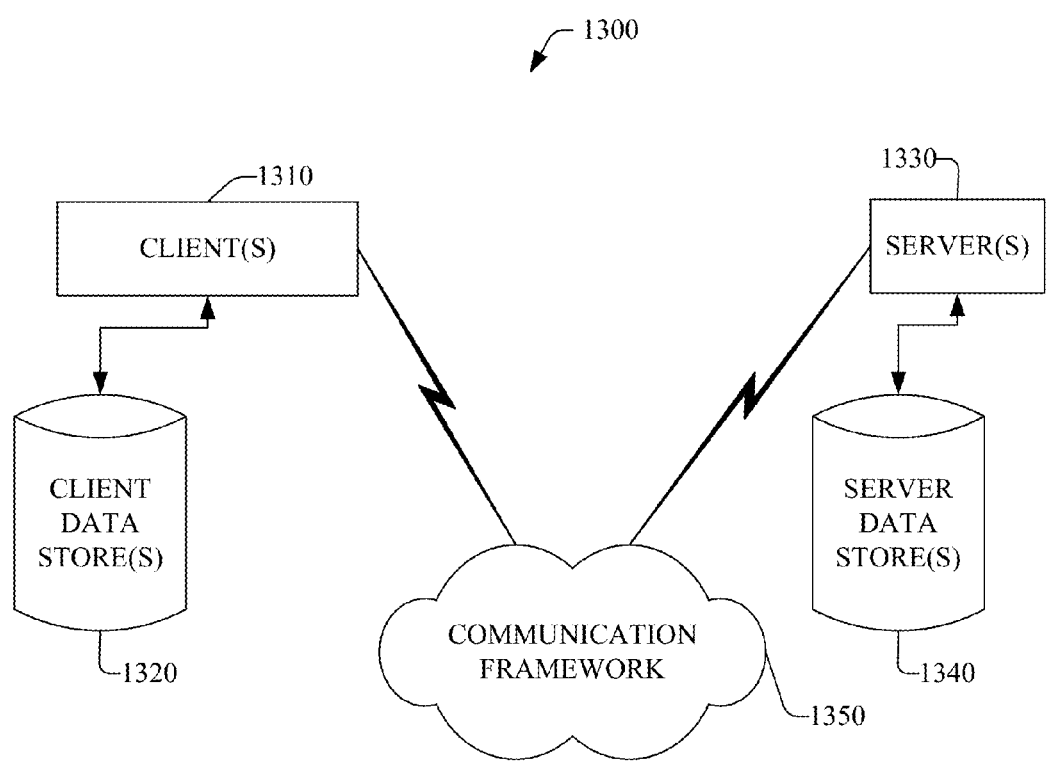
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 12, a suitable environment 1200 for implementing various aspects of this disclosure includes a computer 1212. The computer 1212 includes a processing unit 1214, a system memory 1216, and a system bus 1218. It is to be appreciated that the computer 1212 can be used in connection with implementing one or more of the systems, components, and/or methods shown and described in connection with FIGS. 1-11, or otherwise described herein. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored, e.g., in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 (e.g., computing system) with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects, features, and/or advantages of the disclosed subject matter can be exploited in substantially any wireless telecommunication or radio technology, e.g., wi-fi; bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, location identifier component, base station, communication network, application, processor component, data store, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, respective frequencies of respective communications of a device associated with a subscriber identity with respective base station devices associated with a communication network over a defined time period, based on activity data associated with the respective communications of the device with the respective base station devices, wherein the respective base station devices comprise a first base station device and second base station devices other than the first base station device, and wherein the respective frequencies comprise a first frequency associated with the first base station device and second frequencies other than the first frequency that are associated with the second base station devices; and
   determining, by the system, a defined base location associated with the subscriber identity, based on the first frequency of the respective communications of the device with the first base station device relative to the second frequencies of the respective communications of the device with the second base station devices, over the defined time period, and further based on address data relating to the subscriber identity and a distance parameter usable to facilitate evaluating the address data.

2. The method of claim 1, wherein the address data comprises registered address data, and wherein the determining the defined base location associated with the subscriber identity comprises determining the defined base location associated with the subscriber identity based on the registered address data associated with a defined geographical area associated with the defined base location and based on the first frequency relative to the second frequencies.

3. The method of claim 1, further comprising:
   designating, by the system, the defined base location as a defined home location associated with the subscriber identity.

4. The method of claim 1, wherein the address data comprises registered address data, and wherein the method further comprises:
   determining, by the system, a first potential base location associated with the subscriber identity based on the activity data;
   analyzing, by the system, the registered address data relating to the subscriber identity;
   determining, by the system, a second potential base location associated with the subscriber identity based on the registered address data; and
   determining, by the system, the defined base location associated with the subscriber identity based on the first potential base location, the second potential base location, a distance between the first potential base location and the second potential base location, and a distance parameter, in accordance with a defined location criterion.

5. The method of claim 1, wherein the activity data comprises anonymized communication data associated with the subscriber identity.

6. The method of claim 1, wherein the defined base location is associated with a sector covered by the first base station device, and wherein the sector covers a defined geographical area.

7. The method of claim 1, wherein the defined base location is a defined geographical area associated with a postal code.

8. The method of claim 1, further comprising:
   determining, by the system, respective voice communication values associated with the respective base station devices based on first activity data of the activity data that relates to voice communications between the device and the respective base station devices;
   determining, by the system, respective data communication values associated with the respective base station devices based on second activity data of the activity data that relates to data communications between the device and the respective base station devices; and
   determining, by the system, respective messaging communication values associated with the respective base station devices based on third activity data of the activity data that relates to messaging communications between the device and the respective base station devices.

9. The method of claim 8, further comprising:
   determining, by the system, respective voice weighting values associated with the respective base station devices based on the first activity data;
   generating, by the system, respective weighted voice communication values associated with the respective base station devices based on the respective voice communication values and the respective voice weighting values;
   determining, by the system, respective data weighting values associated with the respective base station devices based on the second activity data;
   generating, by the system, respective weighted data communication values associated with the respective base station devices based on the respective data communication values and the respective data weighting values;
   determining, by the system, respective messaging weighting values associated with the respective base station devices based on the third activity data; and
   generating, by the system, respective weighted messaging communication values associated with the respective base station devices based on the respective messaging communication values and the respective messaging weighting values.

10. The method of claim 9, further comprising:
    determining, by the system, respective final weighted scores associated with the respective base station devices based on the respective weighted voice communication values, the respective weighted data communication values, and the respective weighted messaging communication values, wherein the respective final weighted scores comprise a first final weighted score associated with the first base station device and second final weighted scores associated with the second base station devices;

identifying, by the system, the first final weighted score as having a highest weighted score relative to the second final weighted scores; and determining, by the system, the defined base location associated with the subscriber identity based on the first base station device having the highest weighted score and a geographic location associated with the first base station device.

11. A system, comprising:

a processor; and a memory that stores executable instructions that, when executed by the processor, facilitate performance of operations, comprising:

determining respective levels of respective communications of a device associated with a user identity with respective base station devices associated with a communication network over a defined time period, based on activity data associated with the respective communications of the device with the respective base station devices; and determining a defined base location associated with the user identity based on a level, of the respective levels, of the respective communications of the device with a base station device of the respective base station devices relative to other levels, of the respective levels other than the level, of the respective communications of the device with other base station devices of the respective base station devices other than the base station device, over the defined time period, and further based on address-related information associated with the user identity and a distance parameter that is applicable with respect to the address-related information.

12. The system of claim 11, wherein the operations further comprise:

assigning the defined base location to be a defined home location associated with the user identity.

13. The system of claim 11, wherein the operations further comprise:

determining a first potential base location associated with the user identity based on the activity data;

analyzing the address-related information relating to the user identity;

determining a second potential base location associated with the user identity based on the address-related information; and determining the defined base location associated with the user identity based on the first potential base location, the second potential base location, a distance between the first potential base location and the second potential base location, and the distance parameter, in accordance with a defined location criterion.

14. The system of claim 11, wherein the operations further comprise:

applying respective weight factors to respective portions of the respective communications to facilitate the determining the defined base location, and wherein the respective portions of the respective communications comprise a first portion of the respective communications that relates to voice communications associated with the device, a second portion of the respective communications that relates to data communications associated with the device, and a third portion of the respective communications that relates to messaging communications associated with the device.

15. The system of claim 11, wherein the activity data comprises anonymized communication data associated with the user identity.

16. The system of claim 11, wherein the defined base location is associated with a coverage area associated with the base station device.

17. The system of claim 11, wherein the defined base location is a defined geographical area associated with a postal code.

18. The system of claim 11, wherein the operations further comprise:

receiving the activity data, wherein at least a portion of the activity data is derived from call detail records associated with the respective communications of the device.

19. A non-transitory machine-readable storage medium, comprising executable instructions that, when executed by a processor, facilitate performance of operations, comprising:

determining respective frequencies of respective communications of a device associated with a user identity with respective base station devices associated with a communication network over a defined time period, based on activity data associated with the respective communications of the device with the respective base station devices; and identifying a defined base location associated with the user identity, based on a frequency, of the respective frequencies, of a first portion of the respective communications of the device with a base station device of the respective base station devices relative to a group of the respective frequencies not comprising the frequency of a second portion of the respective communications of the device with a group of the respective base station devices not comprising the base station device, over the defined time period, based on address-related data associated with a defined geographical area that is associated with the user identity, and based on a distance value that is applicable to the address-related data.

20. The non-transitory machine-readable storage medium of claim 19, wherein the identifying the defined base location associated with the user identity comprises identifying the defined base location associated with the user identity based on the address-related data associated with the defined geographical area and based on the frequency of the first portion of the respective communications of the device with the base station device relative to the other frequencies of the second portion of the respective communications of the device with the group of the respective base station devices over the defined time period.

* * * * *